US010893691B2

(12) United States Patent
Zittel et al.

(10) Patent No.: US 10,893,691 B2
(45) Date of Patent: *Jan. 19, 2021

(54) COOLING MECHANISM FOR USE WITH A FOOD PROCESSING SYSTEM

(71) Applicant: Lyco Manufacturing Inc., Columbus, WI (US)

(72) Inventors: David R. Zittel, Columbus, WI (US); Daniel D Maupin, Corvallis, OR (US); Scott K. Weisman, Columbus, WI (US); Steven J. Schultz, Beaver Dam, WI (US); Jeffrey S. Zittel, Columbus, WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/495,557

(22) Filed: Apr. 24, 2017

(65) Prior Publication Data

US 2017/0223991 A1 Aug. 10, 2017

Related U.S. Application Data

(63) Continuation of application No. 12/501,758, filed on Jul. 13, 2009, now Pat. No. 9,629,389.

(51) Int. Cl.
*A23L 3/375* (2006.01)
*A23L 3/36* (2006.01)
*F25D 13/06* (2006.01)

(52) U.S. Cl.
CPC ............... *A23L 3/375* (2013.01); *A23L 3/361* (2013.01); *F25D 13/065* (2013.01); *A23V 2002/00* (2013.01)

(58) Field of Classification Search
CPC ..... A23L 3/375; A23L 3/361; A23V 2002/00; F25D 13/065; F25D 13/06; F25D 13/02; F25D 13/00
(Continued)

(56) References Cited

U.S. PATENT DOCUMENTS 2,299,080 A  10/1942  DeBack
2,314,871 A   3/1943  Deback
(Continued)

FOREIGN PATENT DOCUMENTS

EP    2145846    1/2010
EP    10250294   1/2011
(Continued)

OTHER PUBLICATIONS

Machine translation of abstract of FR2578822 on Jan. 26, 2012.
(Continued)

*Primary Examiner* — Elizabeth J Martin
(74) *Attorney, Agent, or Firm* — George R. Corrigan

(57) ABSTRACT

A cooler including a compartment, a conduit including a first end portion configured to be in communication with the compartment and a second end portion, food product at a first product temperature entering the first end portion, a fluid discharge positioned substantially within the conduit between the first end portion and the second end portion, and a pressurized fluid source in communication with and for supplying fluid through the fluid discharge, the fluid being at a first fluid temperature less than the first product temperature, the pressurized fluid source being operable to propel the fluid through the fluid discharge to move the food product from the first end portion of the conduit toward the second end portion and to cool the food product to a temperature below the first product temperature.

24 Claims, 18 Drawing Sheets

(58) Field of Classification Search
USPC .......................................................... 62/63
See application file for complete search history.

(56) References Cited

U.S. PATENT DOCUMENTS

| | | | | | |
|---|---|---|---|---|---|
| 3,488,973 | A | * | 1/1970 | Wright | A23B 4/062 |
| | | | | | 62/63 |
| 3,918,116 | A | * | 11/1975 | Valdespino | A23N 12/02 |
| | | | | | 15/3.13 |
| 5,280,748 | A | | 1/1994 | Pardo | |
| 5,329,842 | A | | 7/1994 | Zittel | |
| 5,697,116 | A | * | 12/1997 | Loferer | A63B 47/04 |
| | | | | | 15/21.2 |
| 5,752,431 | A | | 5/1998 | Zittel | |
| 5,972,413 | A | | 10/1999 | Whitney et al. | |
| 6,301,905 | B1 | | 10/2001 | Gallus | |
| 7,500,426 | B2 | | 3/2009 | Zittel et al. | |
| 2006/0283333 | A1 | | 12/2006 | Zittel et al. | |
| 2007/0044666 | A1 | | 3/2007 | Zittel et al. | |
| 2010/0015311 | A1 | | 1/2010 | Stousland et al. | |

FOREIGN PATENT DOCUMENTS

| | | |
|---|---|---|
| FR | 2578822 | 9/1986 |
| FR | 2871343 | 12/2005 |
| NO | 95/35040 | 12/1995 |

OTHER PUBLICATIONS

Idaho Steel, Product Detail—Blancher or Preheater, available online at: <http://www.idahosteel.com/Blancher.htm>, at least as early as Aug. 2008.

G. J. Olney, Inc., Destoning Washer with E-Z Clean Stone Crib for Peas and Lima Beans, Brochure, Bulletin 96SB29, available at least as early as Aug. 2008.

Venturi Jet Pumps Ltd., Hooper Eductors, Hooper Eductors for pumping and conveying granular solids and powders, available online at: <http://www.venturipumps.com/hoppereductor.htm>, available at least as early as Aug. 2008.

Stratton, Harry, "Liquid Jet Eductors—The "Pumps" with no Moving Parts", Plant Engineering, Apr. 29, 1976.

Schutte & Koerting, Solids Handling Eductors Eductors Using Liquid in Handling Dry Solids, available online at: <http://www.s-k.com/pages/pro.sub.-02.sub.--02.html>, available at least as early as May 2009.

Northeast Controls Inc., Intermittent Operation Arrangement, available online at: <http://www.nciweb.net/newpage61.htm>, available at least as early as May 2009.

Schutte & Koerting, Eductors & Syphons—Annular Multi-Nozzle Eductor, available online at: <http://www.s-k.com/pages/pro.sub.-01.sub.--07.html>, available at least as early as May 2009.

Derbyshire Machine & Tool Co., Peri-Jets & Eductors, available online at: <http://www.derbyshiremachine.com/perijet.html>, available at least as early as Jun. 2008.

Exair, How the Exair Line Vac Works, Air Operated Conveyors, available online at: <http://www.exair.com/en-US/Primary%20Navigation/Products/Air%20Operat- ed%20Conveyors/Pages/How%20Line%20Vac%20Works.aspx>, available at least as early as May 2009.

\* cited by examiner

COOLING MECHANISM FOR USE WITH A FOOD PROCESSING SYSTEM

RELATED APPLICATIONS

This is a continuation of, and claims the benefit of the filing date of, U.S. patent application Ser. No. 12/501,758, filed on Jul. 13, 2009, which issued on Apr. 25, 2017 as U.S. Pat. No. 9,629,389.

FIELD OF THE INVENTION

The present invention relates to food processing systems and, more particularly, to cooling mechanisms for use with food processing systems.

BACKGROUND

In mass processing of food product, the food product is often heated by cooking or blanching the food product in a cooker using a hot heat transfer medium into which the food product is immersed. After cooking or blanching, the food product is either transferred out of the food processing system, or is cooled or chilled by immersing the food product in a cool heat transfer to stop being processed.

SUMMARY

In such food processing systems, it may desirable to quickly and efficiently cool cooked food product. It may also be desirable to transfer the food product between the hot and cool heat transfer mediums while minimizing, for example, crossover of the hot heat transfer medium into the cool heat transfer medium. In addition, it may be desirable to transfer the food product between processing systems or out of a processing system entirely while minimizing loss or waste of the heat transfer mediums.

In some constructions and in some independent aspects, the present invention may provide a food processing system, such as a cooler, cooker-cooler, etc. The cooler may generally include a compartment, a conduit including a first end portion configured to be in communication with the compartment and a second end portion, food product at a first product temperature entering the first end portion, a fluid discharge positioned substantially within the conduit between the first end portion and the second end portion, and a pressurized fluid source in communication with and for supplying fluid through the fluid discharge, the fluid being at a first fluid temperature less than the first product temperature, the pressurized fluid source being operable to propel the fluid through the fluid discharge to move the food product from the first end portion of the conduit toward the second end portion and to cool the food product to a temperature below the first product temperature.

In some constructions and in some independent aspects, a cooler may generally include a first compartment, a first conduit including a first end portion configured to be in communication with the first compartment and a second end portion, food product at a first product temperature entering the first end portion of the first conduit, a first fluid discharge positioned substantially within the first conduit between the first end portion and the second end portion, a second compartment separate from the first-mentioned compartment, the second compartment receiving food product from the second end portion of the first-mentioned conduit, a second conduit including a first end portion configured to be in communication with the second compartment and a second end portion, food product at a second product temperature entering the first end portion of the second conduit, a second fluid discharge positioned substantially within the second conduit between the first end portion and the second end portion, and a pressurized fluid source in communication with and for supplying fluid through at least one of the first fluid discharge and the second fluid discharge, the fluid being at a first fluid temperature less than an associated at least one of the first product temperature and the second product temperature, the pressurized fluid source being operable to propel the fluid through the at least one of the first fluid discharge and the second fluid discharge to move the food product through an associated at least one of the first conduit and the second conduit from the first end portion of toward the second end portion and to cool the food product to a temperature below the first product temperature.

In some constructions and in some independent aspects, the present invention may provide a method of cooling food product in a cooler, the cooler including a compartment, a conduit including a first end portion configured to be in communication with the compartment and a second end portion, a fluid discharge positioned substantially within the conduit between the first end portion and the second end portion, and a pressurized fluid source in communication with and for supplying fluid through the fluid discharge. The method may generally include the acts of receiving food product into the compartment, discharging fluid through the fluid discharge to move food product from the first end portion of the conduit toward the second end portion the food product being at a first product temperature when entering the first end portion, the fluid being at a first fluid temperature less than the first product temperature, and cooling the food product moving through the conduit to a temperature below the first product temperature.

Other independent aspects of the invention will become apparent by consideration of the detailed description, claims and accompanying drawings.

Before any constructions and/or independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 1:
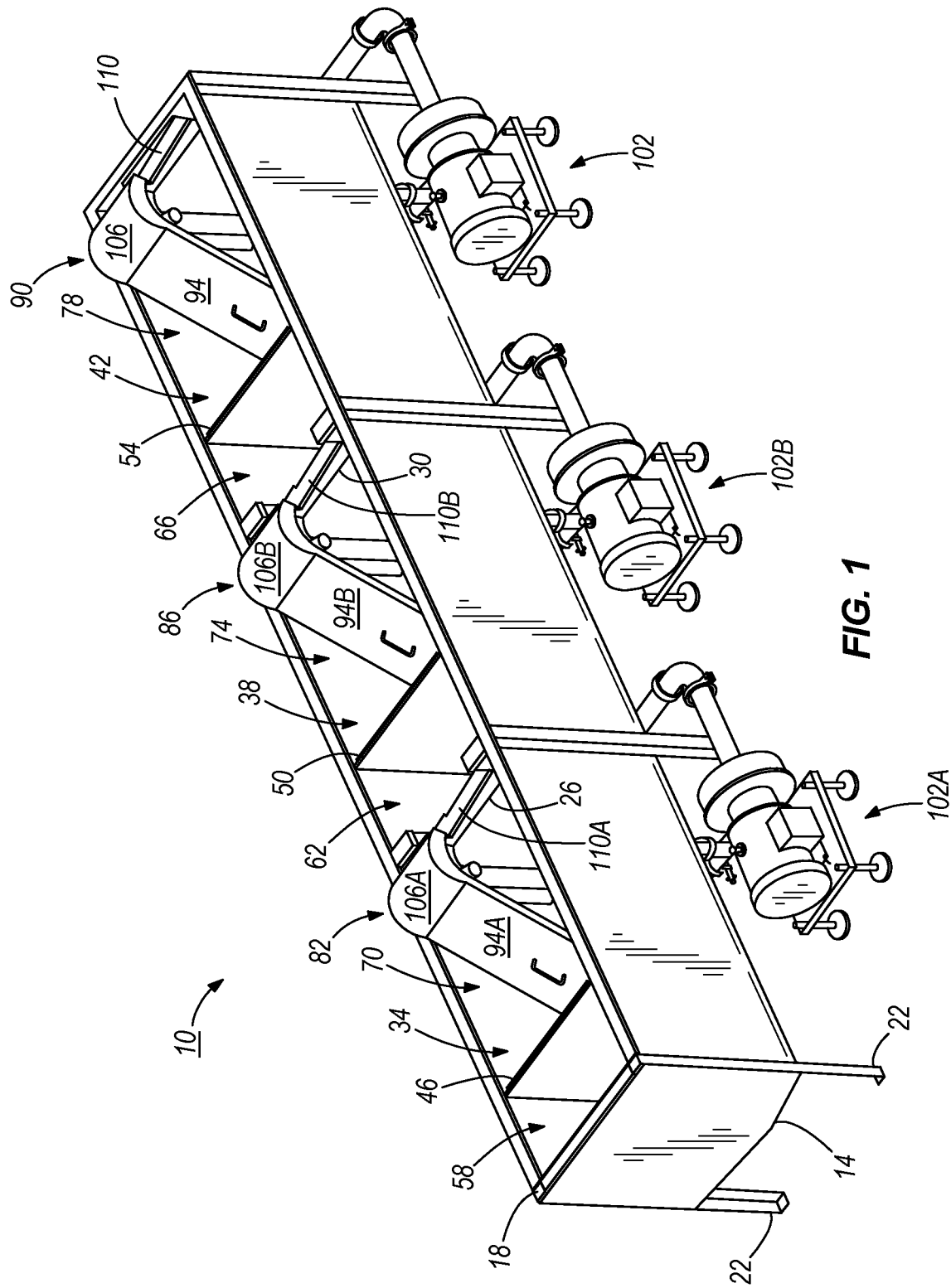
FIG. 1 is a perspective view of a food processing system, such as a cooler.

FIG. 1 illustrates a food processing system, such as a cooler 10. In other constructions, the processing system may be another type of food processing system, such as, for example, a cooker-cooler (see FIGS. 14 and 15), a transport mechanism, etc., or even a non-food processing system.

In the illustrated construction, the cooler 10 includes an open-top tank 14 that is supported by a frame 18 having legs 22 that rest upon a support surface (e.g., the floor) and space the tank 14 above the support surface. The illustrated tank 14 includes two main dividers 26, 30 to divide the tank into three compartments 34, 38, 42, or sections, suitable for processing (e.g., cooling) food product. Fluid flow between the compartments 34, 38, 42 is generally limited to flow over each divider 26, 30.

Each compartment 34, 38, 42 is further divided by an additional divider 46, 50, 54 into a respective product containment section 58, 62, 66 and a respective fluid container or water tank section 70, 74, 78. Each divider 46, 50, 54 substantially retains food product discharged into the compartment 34, 38, 42 within the associated product containment section 58, 62, 66. However, fluid flow within each compartment 34, 38, 42 is provided relative to (e.g., below, above, through, etc.) each divider 46, 50, 54.

In other constructions, the tank 14 may include fewer or more main dividers to divide the tank 14 into fewer or more compartments, sub-compartments. In further constructions, the tank 14 may be a single compartment tank. The tank 14 may be composed of stainless steel or other suitable materials for food processing applications.

As shown in FIGS. 1-4, the cooler 10 includes three cooling mechanisms 82, 86, 90. The first cooling mechanism 82 transfers food product from the first compartment 34 of the tank 14 to the second compartment 42, the second cooling mechanism 86 transfers food product from the second compartment 38 to the third compartment 42, and the third cooling mechanism 90 transfers the food products from the third compartment 42 out of the cooler 10 (e.g., to a packaging system). During transfer from compartment to compartment, each cooling mechanism 82, 86, 90 also cools the food product.

In constructions in which the cooler 10 includes fewer compartments, the cooler 10 may only include a single cooling mechanism to cool and transfer the food product out of the cooler 10. In constructions in which the cooler 10 includes more compartments, the cooler 10 may include more cooling mechanisms to cool and transfer the food product between the additional compartments. In other constructions, the cooling mechanisms 86, 90 may be used in non-food processing applications to cool and/or transfer other types of products.

The cooling mechanisms 82, 86, 90 may be similar to the cooling mechanisms shown and described in U.S. patent application Ser. No. 12/174,297, filed Jul. 16, 2008, and in U.S. patent application Ser. No. 12/501,649, filed Jul. 13, 2009, the entire contents of both of which are hereby incorporated by reference.

In the illustrated construction, the cooling mechanisms 82, 86, 90 are substantially similar, and only the cooling mechanism 90 is described in detail. Common elements in the cooling mechanisms 82 and 86 have the same reference number "A" and "B", respectively.

Figure 6:
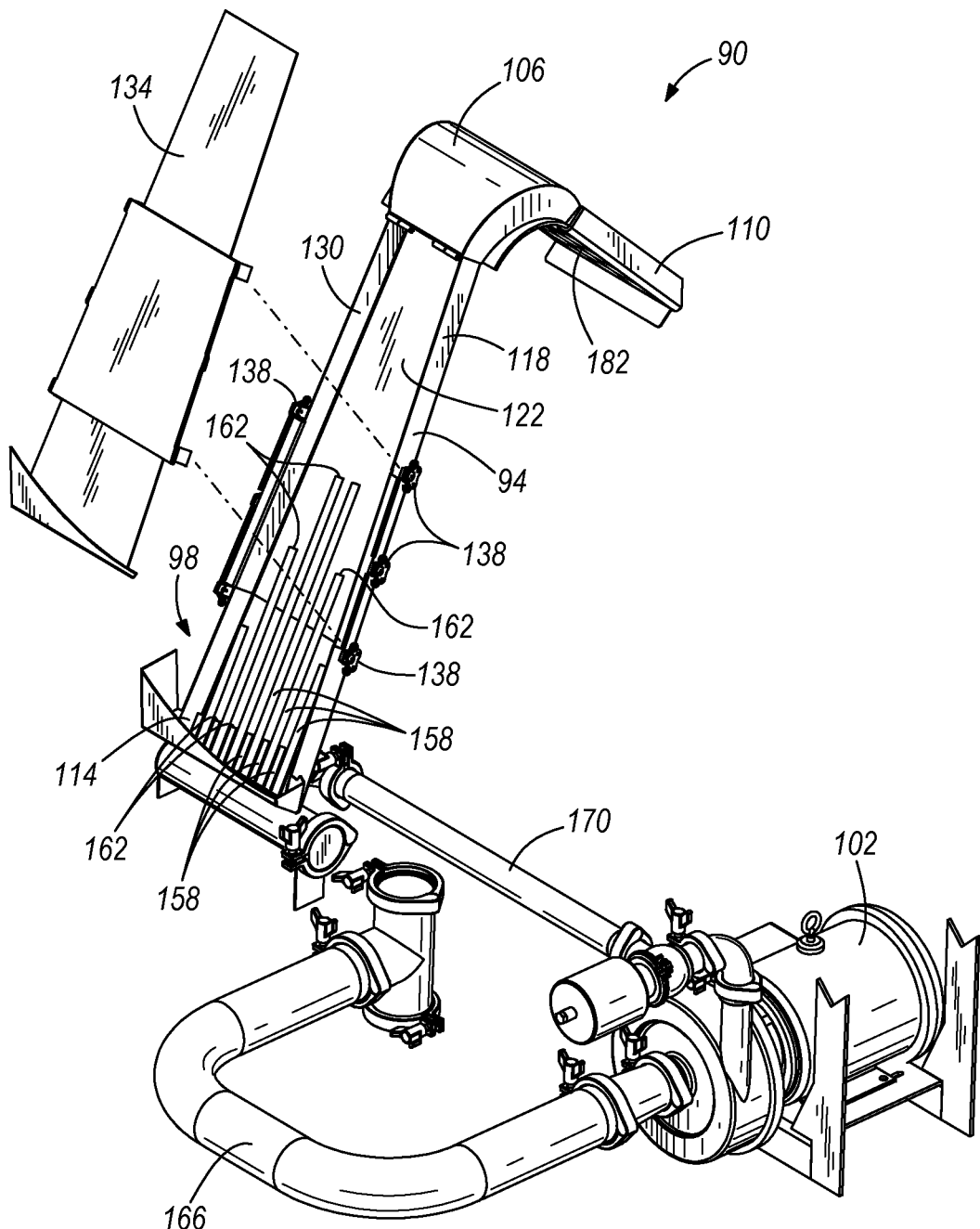
FIG. 6 is a perspective view of a further cooling mechanism for use with the cooler shown in FIG. 1.
Figure 7:
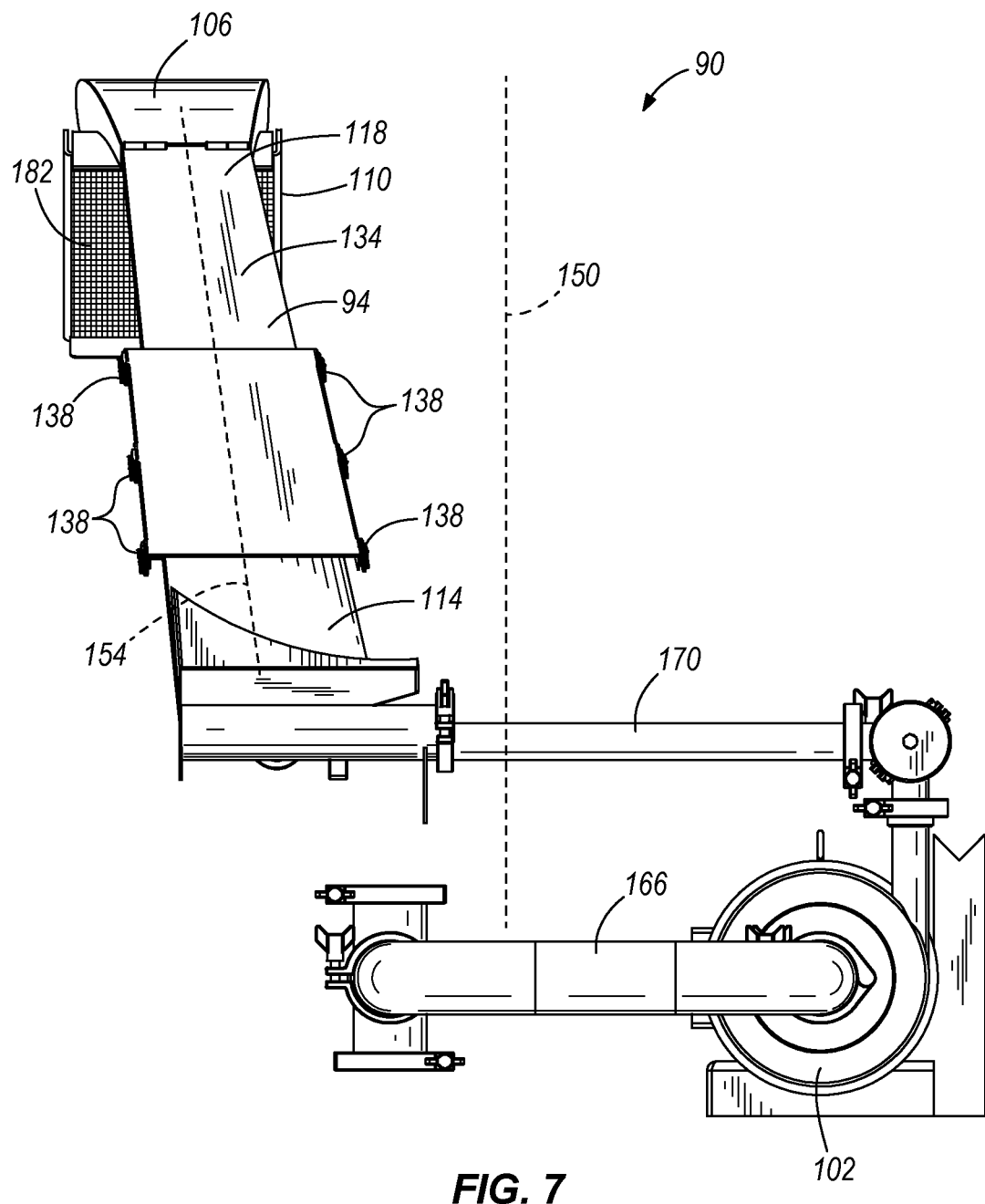
FIG. 7 is a front view of the cooling mechanism shown in FIG. 6.

As shown in FIGS. 6-7, the cooling mechanism 90 includes a conduit 94, a fluid discharge 98, a pressurized fluid source 102, a convex guide member 106, and a dewatering member 110. The conduit 94 includes an inlet, or first end, portion 114 in communication with a compartment (e.g., with a product containment section 58, 62, 66 of a compartment 34, 38, 42) and an outlet, or second end, portion 118 in communication with the convex guide member 106.

The illustrated conduit 94 also includes a lower wall 122, two side walls 126, 130, and an upper wall 134. The lower and side walls 122, 126, 130 are integrally formed as a three-sided member from, for example, sheet stock. The upper wall 134, or cover, is removably coupled to the side walls 126, 130 with clamps 138 to permit easy access to the interior of the conduit 94. Such an arrangement facilitates cleaning and maintenance of the conduit 94.

In the construction shown in FIGS. 6-7, the walls 122, 126, 130, 134 are arranged such that the conduit 94 has a generally rectangular cross-sectional shape that tapers from the inlet portion 114 to the outlet portion 118. That is, the width of the conduit 94 is greater at the inlet portion 114 than at the outlet portion 118. In other constructions (such as that shown in FIGS. 1, 3 and 5, the conduit 94 may have a uniform width along the length of the conduit 94. In still other constructions, the conduit 94 may have other cross-sectional shapes such as, for example, square, circular, elliptical, etc.

Figure 2:
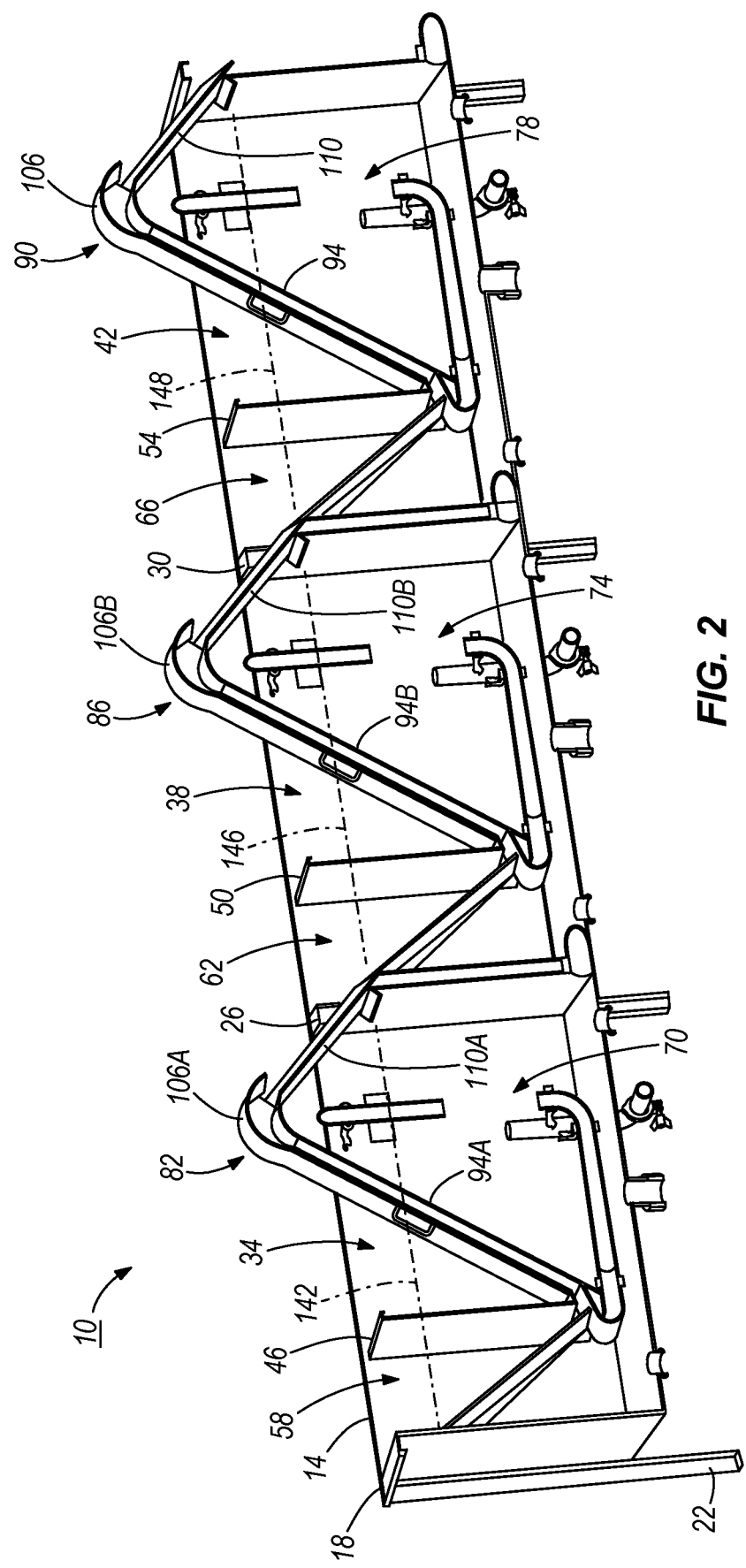
FIG. 2 is a perspective partial cross-sectional view of the cooler shown in FIG. 1.

In the illustrated construction, the conduit 94 is inclined relative to the tank 14 such that the outlet portion 118 is positioned above and downstream of the inlet portion 114. As shown in FIG. 2, the outlet portion 118 is positioned above a fluid level 142, 146, 148 (e.g., the level of the liquid heat transfer medium) in the associated compartment 34, 38, 42, while the inlet portion 114 is positioned below the fluid level 142, 146, 148. In the illustrated construction, the fluid levels 142, 146, 148 in the compartments 34, 38, 42 are at substantially the same height. In other constructions, the fluid levels 142, 146 may be at substantially different heights relative to one another.

As shown in FIG. 7, the conduit 94 is also angled relative to a vertical, central longitudinal plane 150 extending through the tank 14. In the illustrated construction, the conduit 94 defines a central axis 154 extending from the inlet portion 114 to the outlet portion 118. The illustrated axis 154 is offset from and oblique relative to the central plane 150 so that food product is moved laterally relative to the plane 150 as the food product travels through the conduit 94. Such a construction helps the cooling mechanism 90 avoid any existing obstacles that may be present within the tank 14, move the food product to a more favorable discharge point, etc. In other constructions, the inlet portion 114 of the conduit 94 may be further from the central plane 150 than the outlet portion 118 such that the conduit 94 is angled in an opposite direction. In some constructions, such as that shown in FIGS. 3 and 5), the central axis 154 and the conduit 94 may be substantially parallel to and lies within the central plane 150 of the tank 14. In further constructions, the conduit 94 may be positioned such that the axis 154 crosses over the plane 150.

The fluid discharge 98 is positioned within the conduit 94 adjacent to the inlet portion 114. In the construction illustrated in FIGS. 6-7, the fluid discharge 98 includes a plurality of nozzles 158 to direct a flow of pressurized fluid from the fluid source 102 upwardly through the conduit 94. Each nozzle 158 defines an outlet 162 positioned between the inlet portion 114 and the outlet portion 118 of the conduit 94. In the illustrated construction, the outlets 162 of the nozzles 158 are staggered relative to one another within the conduit 94 such that some of the nozzles 158 extend further upwardly into the conduit 94 than others. The nozzles 158 help focus, and thereby pressurize, fluid from the fluid source 102, ensuring the fluid has sufficient flow strength when exiting the outlets 162 to push food product upwardly through the conduit 94 to the outlet portion 118. In other constructions, the fluid discharge 98 can include other focusing devices (e.g., one or more slots, as shown in FIGS. 8, 10, 12-13 and 18-19) suitable for focusing and pressurizing fluid.

Figure 4:
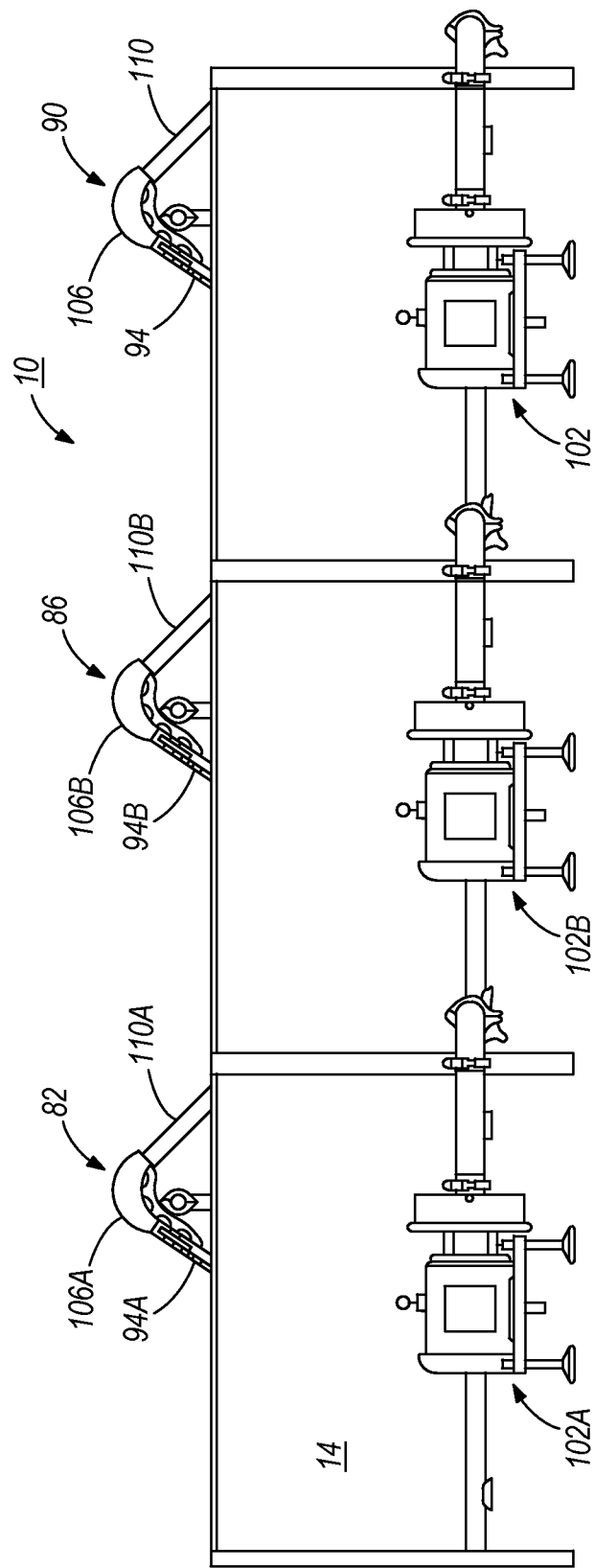
FIG. 4 is a side view of the cooler shown in FIG. 1.
Figure 5:
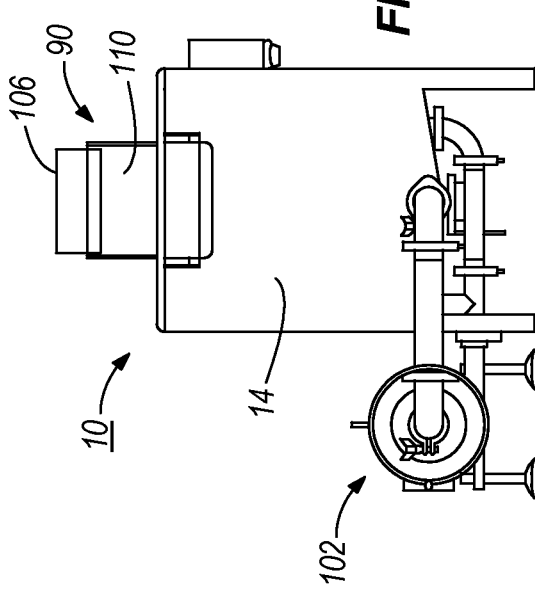
FIG. 5 is a discharge end view of the cooler shown in FIG. 1.

The pressurized fluid source 102 is in communication with the fluid discharge 98 to propel a fluid through the nozzles 158. In the illustrated construction, the fluid source 102 is a pump and includes an inlet pipe 166 and an outlet pipe 170. In other constructions, the pressurized fluid source 102 may be a different device operable to propel a fluid through the nozzles 158. As shown in FIGS. 4-5, the pump 102 is positioned lower than the tank 14. The pump 102 circulates a fluid from the inlet pipe 166, through the outlet pipe 170, and to the fluid discharge 98. The fluid may be, for example, heat transfer medium from one of the compartments 34, 38, 42 of the tank 14 or may be fluid from a dedicated source that is separate from the tank 14. A chiller 172 may be thermally coupled to the inlet pipe 166 or the outlet pipe 170 to cool the fluid to an appropriate temperature before reaching the tank 14.

In some constructions, the inlet pipe 166 is in communication with a compartment 34, 38, 42 of the tank 14 to direct heat transfer medium from the compartment 34, 38, 42 into the pump 102. The heat transfer medium is thereby circulated between the pump 102, the conduit 94 and the compartment 34, 38, 42 such that the fluid level 142, 146, 148 remains generally constant within the first compartment 34, 38, 42.

In other constructions, the inlet pipe 166 is in communication with a dedicated fluid source to direct fluid from the dedicated source into the pump 102. The fluid is propelled by the pump 102 through the outlet pipe 170, out of the fluid discharge 98, and eventually reaches the tank 14. In such constructions, the fluid in the dedicated source may have generally the same composition as the heat transfer medium such that the fluid supplements the heat transfer medium for cooking or cooling. In addition, a fluid level sensor may be positioned within the tank 14 to monitor if the fluid level (which is now a combination of the heat transfer medium and the fluid from the dedicated source) rises or falls too much.

The fluid discharge 98 and the pressurized fluid source 102 generate a vacuum force at the inlet portion 114 of the conduit 94. The vacuum force helps draw food product into the inlet portion 114 of the conduit 94 such that the fluid being discharged by the nozzles 158 moves the food product toward the outlet portion 118 of the conduit 94. Once the food product enters the conduit 94, the pressurized fluid exiting the fluid discharge 98 lifts the food product against the force of gravity through the conduit 94 and toward the convex guide member 106. The fluid also cools the food product as it moves through the conduit 94. The flow from the fluid discharge 98 tends to separate and individuate the food product to improve cooling of the food product.

The vacuum force generated in the first cooling mechanism 82 helps pull the food product toward the bottom and out of product containment section 58 of the first compartment 34 and into the conduit 94A. The vacuum force generated in the second cooling mechanism 86 helps pull the food product toward the bottom and out of the product containment section 62 of the second compartment 38 and into the conduit 94B. The vacuum force generated in the third cooling mechanism 90 helps pull the food product toward the bottom and out of the product containment section 66 of the third compartment 38 and into the conduit 94. In each case, the fluid also cools the food product as it flows through each conduit 94A, 94B, 94.

Referring to FIGS. 6-7, the convex guide member 106 is an arcuate conduit portion positioned adjacent to and in communication with the outlet portion 118 of the conduit 94. The convex guide member 106 receives food product and fluid from the conduit 94 and redirects the food product and the fluid downwardly toward the dewatering member 110. The illustrated convex guide member 106 is configured such that the conduit 94, the convex guide member 106, and the dewatering member 110 form a generally inverted V-shape, as shown in FIG. 2. In the illustrated construction, the inverted V-shape is formed at about a right angle between the conduit 94 and the dewatering member 110. In other constructions, the inverted V-shape may be formed at an acute angle or an obtuse angle between the conduit 94 and the dewatering member 110.

As shown in FIGS. 6-7, the dewatering member 110 is coupled to and in communication with the convex guide member 106. The illustrated dewatering member 110 separates the food product from the fluid and directs the food product into the subsequent product containment section 62, 66 (in the case of the first and second cooling mechanisms 82, 86) or out of the cooler 10 (e.g., onto a discharge chute (not shown), in the case of the third cooling mechanism 90).

In the illustrated construction, the dewatering member 110 includes a screen 182. The screen 182 is inclined to define a ramp for food product to tumble (e.g., slide and/or roll) downwardly along. For example, the illustrated screen 182 is inclined to define a surface substantially parallel to the direction of flow of the food product exiting the convex guide member 106, reducing turbulence and disruption of the flow from the convex guide member 106 to the dewatering member 110.

The screen 182 also defines openings for the fluid to fall through under the influence of gravity. The openings are smaller than the food product so that, as the fluid falls through the screen, the food product is retained on the screen 182 and continues toward the subsequent product containment section 62, 66 or out of the cooler 10. In some constructions, a portion of the conduit 94 and/or the convex guide member 106 may also be a screen to facilitate dewatering the food product. In the illustrated construction, the dewatering member 110 is positioned such that a majority of the separated fluid is returned to the fluid tank section 70, 74, 78 of the associated compartment 34, 38, 42. In this manner, fluid heated by the food product is not passed onto the subsequent cooling operation to improve the efficiency of the subsequent cooling operation.

To help retain the fluid heated by the food product, the screen 182 may positioned substantially above a tray (not shown) in the subsequent compartment. The tray would catch the fluid that falls through the screen 182 and direct the fluid back to previous compartment. Such arrangements help maintain the different heat transfer medium in its associated compartment. That is, the cooler heat transfer medium is retained in the third compartment 42, while the warmest heat transfer medium is retained in the first compartment 34.

In operation, referring to FIGS. 1-4, hot food product is transferred into the cooler 10 and is received in the product containment section 58 of the first compartment 34. The relatively colder heat transfer medium within the product containment section 58 begins to rapidly cool the food product. The food product sinks or is pulled by the vacuum force generated by the first cooling mechanism 82 toward the bottom of the product containment section 58. Once the food product is pulled into the conduit 94A of the first cooling mechanism 82, the pressurized fluid exiting the nozzles 158A lifts and pushes the food product against the force of gravity to move the food product toward the convex guide member 106A. The fluid flowing through the conduit 94A also cools the food product. The food product and the fluid flow through the convex guide member 106A and onto the dewatering member 110A. At this time, the food product tumbles down the dewatering member 110A, while the heated fluid falls through the screen 182A of the dewatering member 110A and into the fluid tank section 70 of the first compartment 34.

The food product falls out of the dewatering member 110A of the first cooling mechanism 82 and into the product containment area 62 in the second compartment 38. The relatively colder heat transfer medium within the product containment section 62 also continues to rapidly cool the food product. The food product sinks or is pulled by the vacuum force generated by the second cooling mechanism 86 toward the bottom of the product containment section 62. The food product is then pulled into the conduit 94B of the second cooling mechanism 86 by the vacuum force generated by the fluid discharge and the pump 102B.

Similar to the first cooling mechanism 82, once the food product is pulled into the conduit 94B of the second cooling mechanism 86, the pressurized fluid exiting the nozzles 158B lifts and pushes the food product against the force of gravity to move the food product toward the convex guide 106B. The fluid flowing through the conduit 94B also continues to cool the food product. The food product and the fluid flow through the convex guide 106B and onto the dewatering member 110B. At this time, the food product tumbles down the dewatering member 110B and into the product containment section 66 of the third compartment 42, while the heated fluid falls through the screen 182B of the dewatering member 110B and into the fluid tank section 74 of the second compartment 38.

Again, the relatively colder heat transfer medium within the product containment section 66 also continues to rapidly cool the food product. Similar to the first and second cooling mechanism 82, 86, once the food product is pulled into the conduit 94 of the third cooling mechanism 90, the pressurized fluid exiting the nozzles 158 lifts and pushes the food product against the force of gravity to move the food product toward the convex guide 106. Again, the fluid flowing through the conduit 94 continues to cool the food product. The food product and the fluid flow through the convex guide 106 and onto the dewatering member 110. At this time, the food product tumbles down the dewatering member 110 and is discharged from the cooler 10 (e.g., via a discharge chute). The cooked and cooled food product may be directed to a packaging system or another food processing system. At the same time, the heated fluid falls through the screen 182 of the dewatering member 110 back into the third compartment 42 where the fluid can be used to help cool more food product in the product containment section 76.

The arrangement of the compartments 34, 38, 42 separated by dividers 26 allows for a counter-flow of the cooling fluid from the discharge compartment 42 toward the infeed compartment 34 of the cooler 10 via fluid levels and gravity. This counter-flow allows the cooling fluid to gain temperature through the process to provide an effective method of cooling.

In the illustrated construction, fluid is returned to the discharge compartment 42 from the chiller 172 at, for example, approximately 33° F. which will provide a relatively large temperature difference with the food product in the compartment 42. As the discharge compartment 42 is becomes overfilled with the returning chiller fluid, the fluid will overflow into the middle compartment 38. The overflowing fluid has gained some heat (e.g., the fluid may be at about 35-38° F.). In the middle compartment, the fluid gains more heat and will eventually overflow into the first compartment 34. In the infeed compartment 34, the temperature difference between the hot food product and the fluid is very great, and the fluid will gain more heat. The heated fluid is returned to the chiller 172 from the first compartment 34 at an elevated temperature (e.g., at about 40-50° F.).

The effectiveness of the cooling process is important in achieving a large temperature difference between the initial product temperature as the hot food product enters the cooler 10 and the final product temperature as the cooled food product is discharged from the cooler 10. However, if an even greater temperature change is desired and/or for certain types of products, the cooler product may be returned through the cooler 10 to undergo further cooling operations to reach the desired final product temperature.

The illustrated cooler 10 with three separate compartments 34, 38, 42 is most efficient to significantly cool food product (from an initial product temperature (e.g., about 200° F.) to a final product temperature (e.g., about 40° F.)). Generally, after passing through the first cooling mechanism 82, the food product may be cooled from an initial product temperature of, for example, about 200° F. to a first cooled product temperature of, for example, about 90° F. After passing through the second cooling mechanism 86, the food product may be further cooled from the first cooled temperature to a second cooled temperature of, for example, about 70° F. Finally, after passing through the third cooling mechanism 90, the food product may be further cooled from the second cooled temperature to a third cooled temperature of, for example, about 40° F. The fluid temperature in each cooling operation is less than the product temperature.

Figure 8:
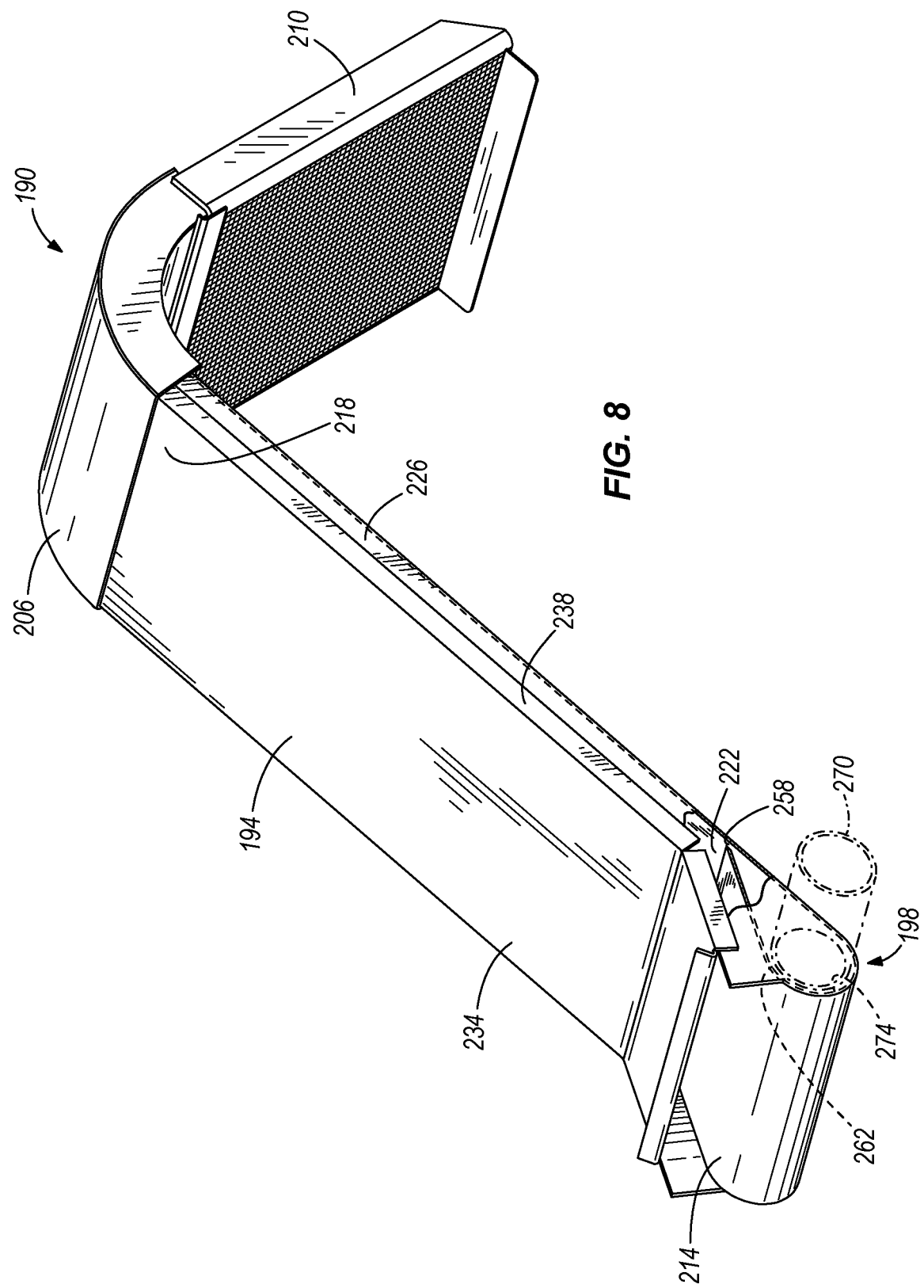
FIG. 8 is a perspective view of another cooling mechanism for use with the cooler shown in FIG. 1.
Figure 9:
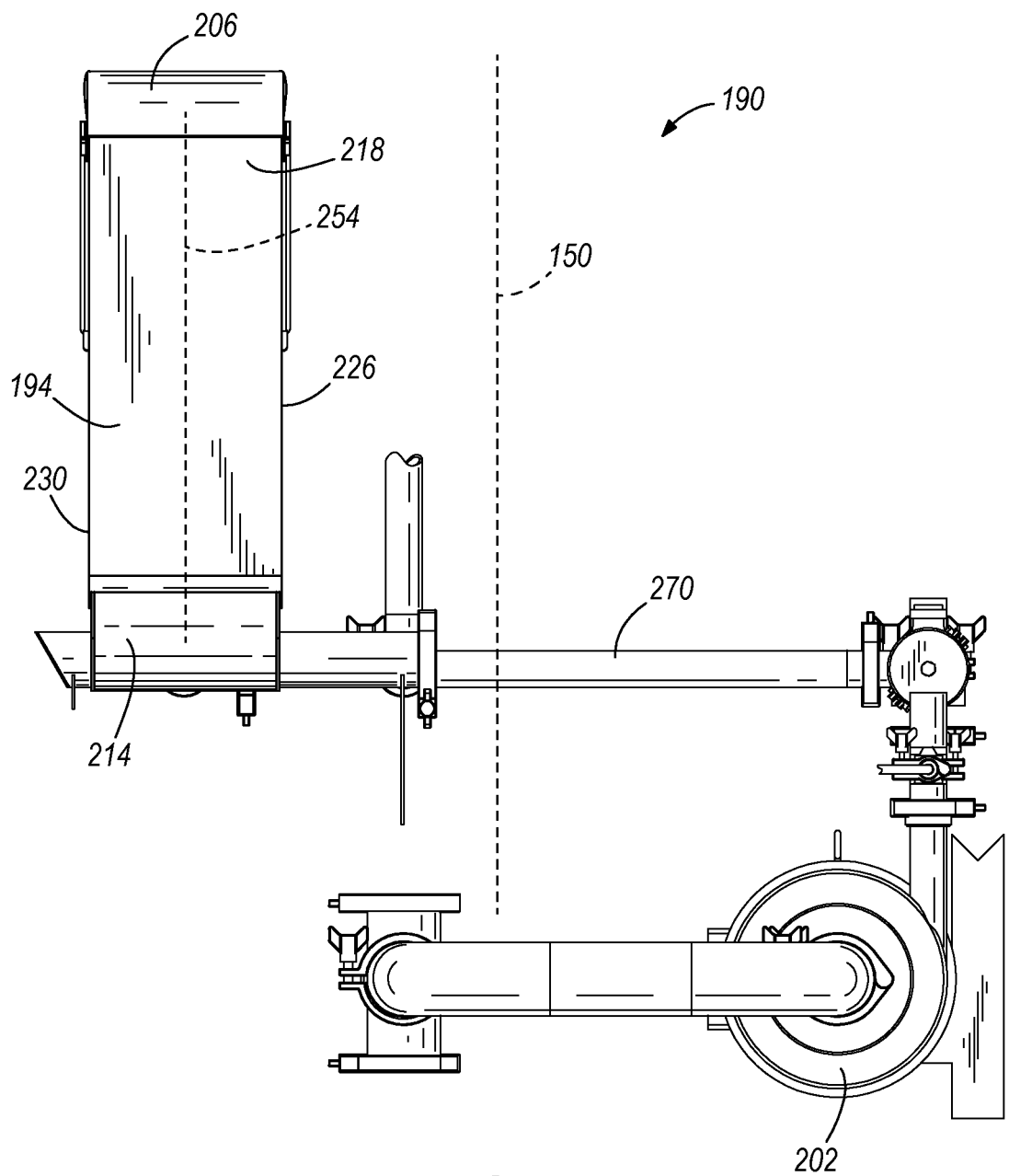
FIG. 9 is a front view of the cooling mechanism shown in FIG. 8.

FIGS. 8-9 illustrate another embodiment of a cooling mechanism 190 for use in the cooler 10. The illustrated cooling mechanism 190 is similar to the cooling mechanisms 82, 86, 90 discussed above with reference to FIGS. 1-7, and common elements have the same reference number plus 100. Reference is made to the description of the cooling mechanisms 82, 86, 90 above for details of the structures and operation, as well as alternatives to the structures and operation, of the cooling mechanism 190 not specifically discussed herein.

The illustrated cooling mechanism 190 includes a conduit 194, a fluid discharge 198, a pressurized fluid source 202 (FIG. 7), a convex guide member 206, and a dewatering member 210. The conduit 194 includes a lower wall 222 and two side walls 226, 230 integrally formed as a three-sided member. An upper wall 234, or cover, is removably coupled to the side walls 226, 230. In the illustrated embodiment, the upper wall 234 includes lips 238 extending over portions of the side walls 226, 230 and is partially captured under the convex guide member 206 to help retain the upper wall 234 in place. In other constructions, the upper wall 234 may be coupled to the side walls 226, 230 with clamps, fasteners, etc. Similar to the conduits 94A, 94B, 94 of the cooling mechanisms 82, 86, 90 discussed above, the walls 222, 226, 230, 234 of the illustrated conduit 194 are arranged such that the conduit 194 has a generally rectangular cross-section. In the illustrated construction, the width of the conduit 194 is substantially constant from an inlet portion 214 of the conduit 194 to an outlet portion 218.

Figure 3:
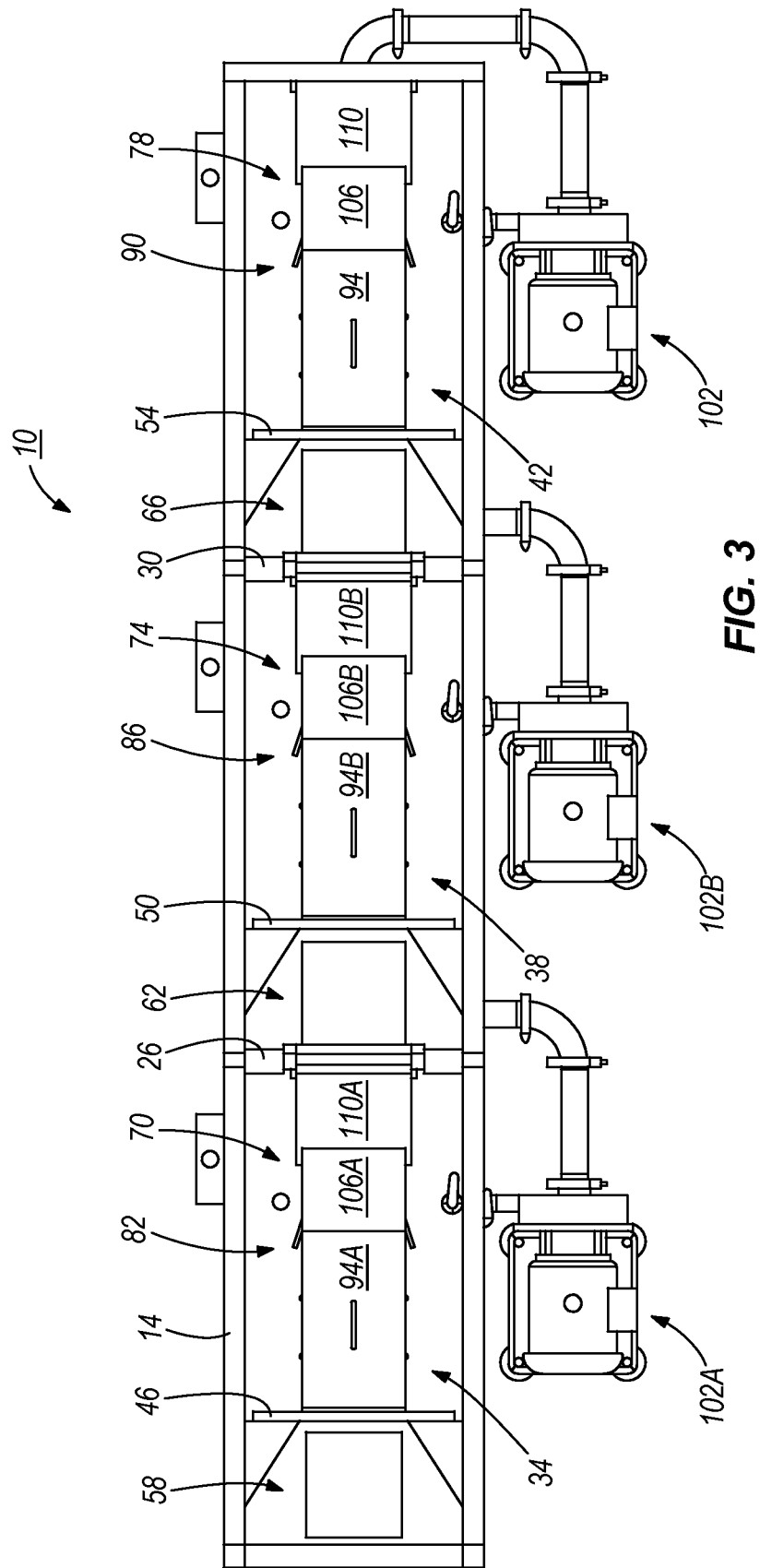
FIG. 3 is a top view of the cooler shown in FIG. 1.

As shown in FIG. 8, the conduit defines a central axis 254 extending from the inlet portion 214 to the outlet portion 218. The illustrated axis 254 and the conduit 194 may be offset from and substantially parallel to the central longitudinal plane 150 extending through the tank 14 of the cooler 10. In other constructions, the axis 254 may be oblique relative to the plane 150 such that the cooling mechanism 194 also directs food product laterally relative to the tank 14 in a manner similar to the cooling mechanisms 82, 86, 90 discussed above. In further constructions, the conduit 194 may be aligned with the plane 150 such that the axis 254 substantially overlies the plane 150 (as shown in FIGS. 3 and 5).

As shown in FIG. 8, the fluid discharge includes a slot 258 positioned adjacent to the inlet portion 214 of the conduit 294. The illustrated slot 258 is formed by doubling over a portion of the lower wall 222 to form a generally teardrop-shaped opening 262. Similar to the nozzles 158 discussed above, the slot 258 helps focus, and thereby pressurize, fluid from the fluid source 202 (FIG. 9), ensuring the fluid has sufficient flow strength to push food product upwardly through the conduit 194 to the outlet portion 218. While the nozzles 158 provide discrete points at which pressurized fluid is discharged into the conduit 94, the slot 258 provides a continuous discharge of fluid along the entire width of the conduit 194. In the illustrated construction, the slot 258 has a height of approximately ⅛" to help focus and pressurize the fluid. In other constructions, the height of the slot 258 may be relatively larger or smaller (e.g., from about 3/16" to about 1/16") to allow more or less fluid to simultaneously flow out of the slot 258. In still other constructions, the size of the slot 258 may be even larger or smaller depending upon the desired capacity of the transfer mechanism 190.

An outlet pipe 270 of the pressurized fluid source 202 (e.g., a pump) extends through an enlarged portion 274 of the teardrop-shaped opening 262. The outlet pipe 270 directs fluid from the pump 202, through the outlet pipe 270, and out of the slot 258. Similar to the cooling mechanisms 82, 86, 90 discussed above, the fluid discharge 198 and the pump 202 generate a vacuum force at the inlet portion 214 of the conduit 194. The vacuum force helps draw food product into the inlet portion 214 such that the pressurized fluid exiting the slot 258 can move the food product toward the convex guide member 206.

Figure 10:
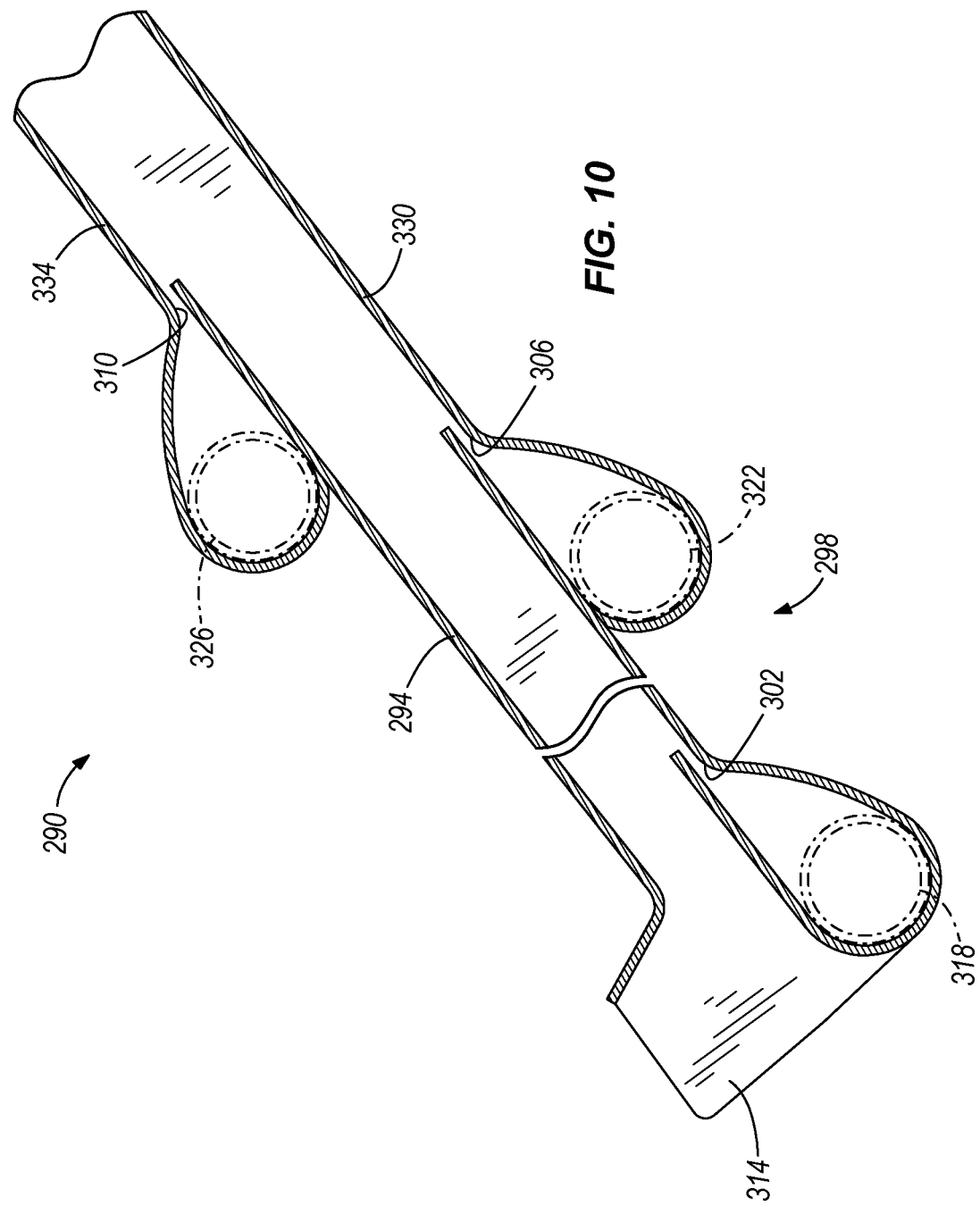
FIG. 10 is a cross-sectional view of yet another cooling mechanism for use with the cooler shown in FIG. 1.

In some constructions, the fluid discharge 198 may include two or more slots positioned along the conduit 194. For example, FIG. 10 illustrates a conduit 294 of a fluid cooling mechanism 290 according to another embodiment of the invention. In the illustrated embodiment, a fluid discharge 298 of the cooling mechanism 290 includes three slots 302, 306, 310 spaced apart along the conduit 294 between an inlet portion 314 and an outlet portion. Each slot 302, 306, 310 is substantially similar to the slot 258 discussed above and is in communication with a separate outlet pipe 318, 322, 326 from a pressurized fluid source.

As shown in FIG. 10, the first slot 302 is directly adjacent to the inlet portion 314 of the conduit 294 (similar to the slot 258 discussed above), the second slot 306 is formed on a lower wall 330 of the conduit 294 downstream of the first slot 302, and the third slot 310 is formed on an upper wall 334 of the conduit 294 downstream of the second slot 306. In other embodiments, the relative positioning of the slots 302, 306, 310 may be altered. For example, all of the slots 302, 306, 310 may be positioned along a single wall of the conduit 294 (e.g., either the lower wall 330 or the upper wall 334), or the slots 302, 306, 310 may be positioned on the conduit 294 alternating between the lower wall 330 and the upper wall 334. In further constructions, the fluid discharge 298 may only include two slots either positioned on the same wall of the conduit 294 or on opposite walls. For example, the fluid discharge 298 may include the first and second slots 302, 306 or may include the first and third slots 302, 310.

The illustrated slots 302, 306, 310 help propel food product through the conduit 294 over a longer distance. For example, while the single slot construction discussed above is operable to lift food product between about 11" and 18", or higher, above the fluid level 142, 146, 148 in the tank 14, two or more slots may be employed to lift the food product even higher above the fluid level 142, 146, 148. Additional slots may be formed in a conduit, as necessary, to lift food product to a desired height above the fluid level 142, 146, 148.

Figure 11:
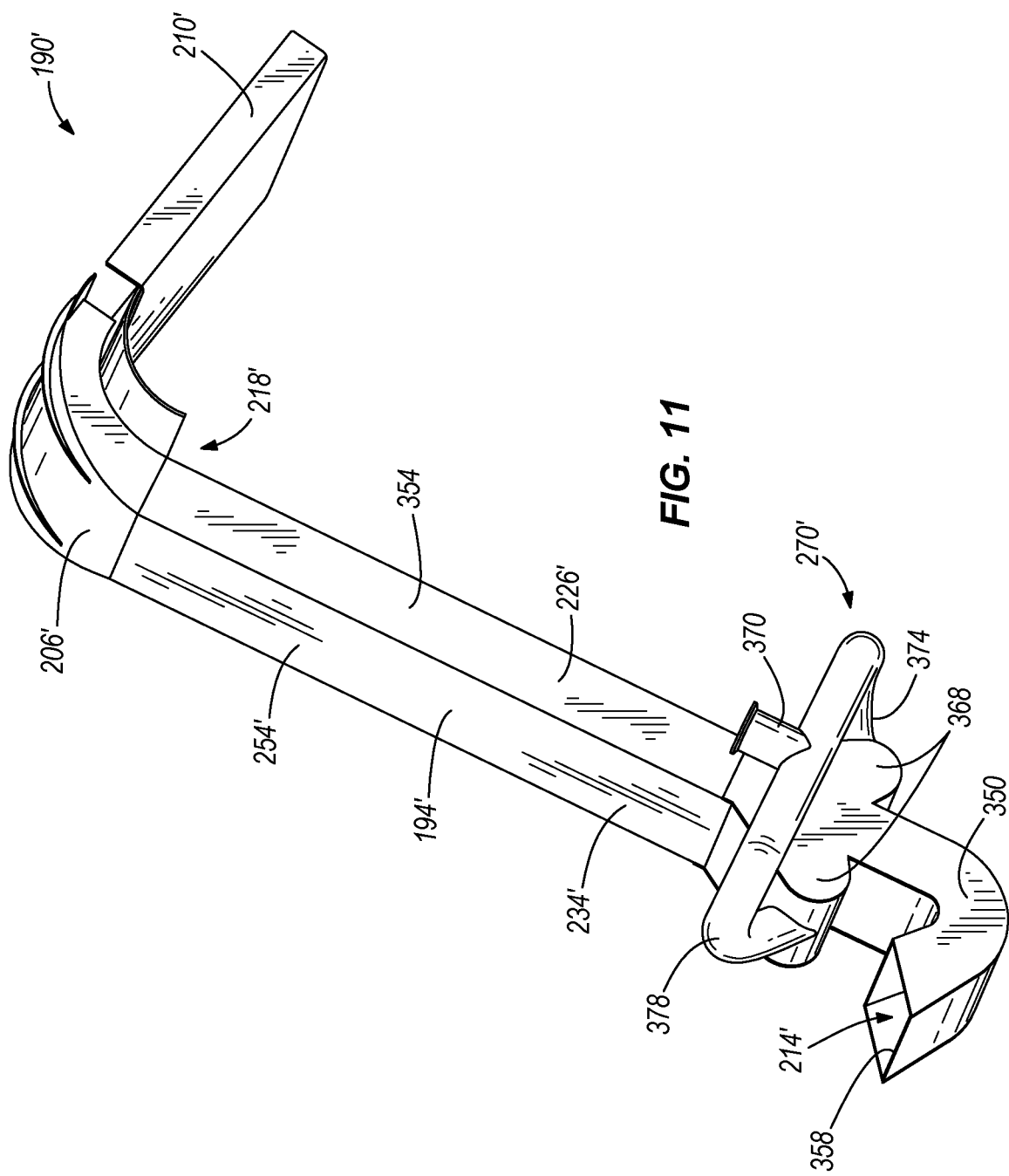
FIG. 11 is a perspective view of a cooling mechanism for use with the cooler shown in FIG. 1.
Figure 12:
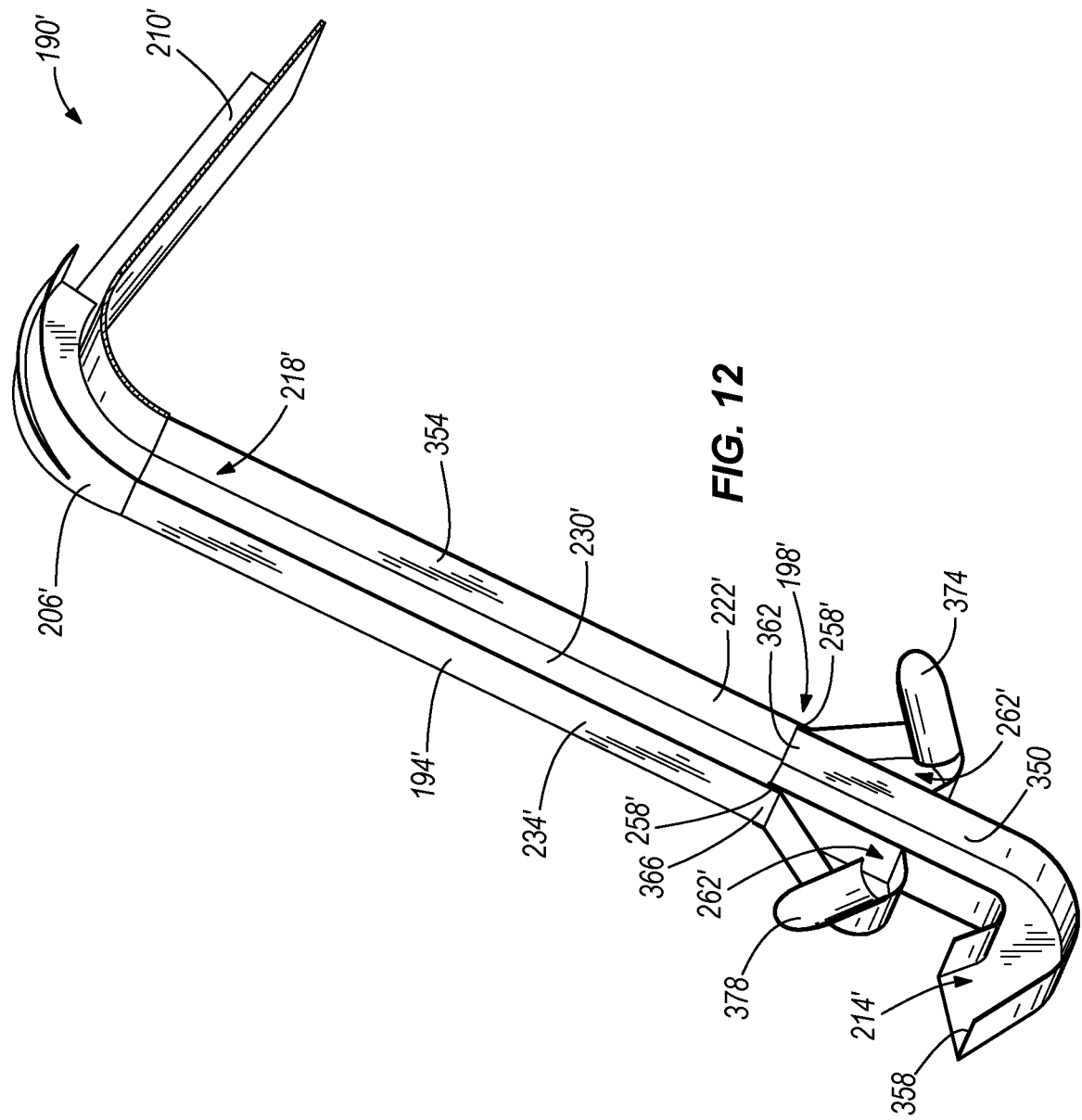
FIG. 12 is a cross-sectional view of the cooling mechanism shown in FIG. 11.
Figure 13:
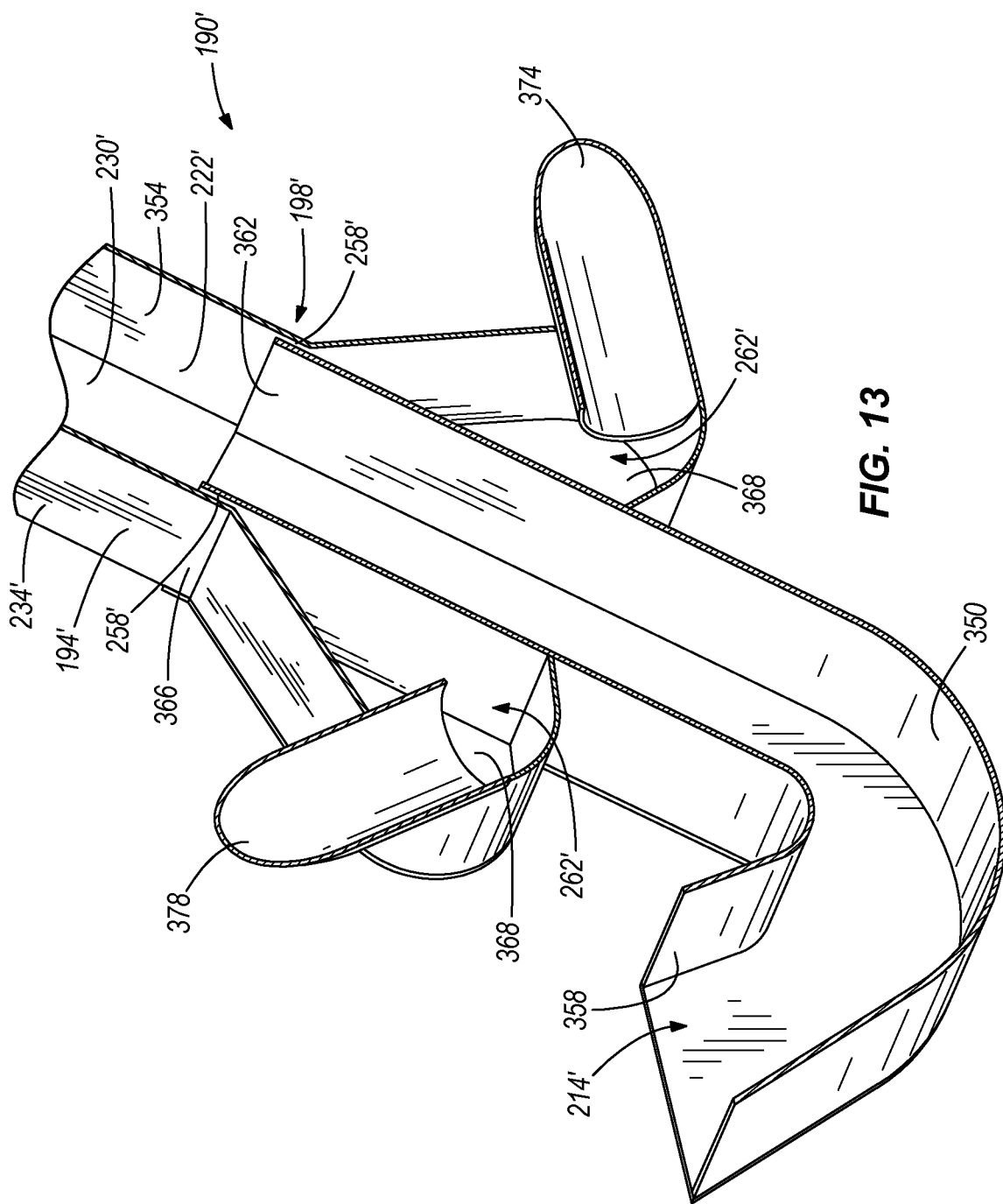
FIG. 13 is an enlarged cross-sectional view of a portion of the cooling mechanism shown in FIG. 7.

FIGS. 11-13 illustrate a further alternative construction of a cooling mechanism 190'. The illustrated cooling mechanism 190' is similar to the cooling mechanisms 190, 290 discussed above with respect to FIGS. 8-10 and/or to the cooling mechanisms 82, 86, 90 discussed above with reference to FIGS. 1-7. Common elements have the same reference numbers "+" Reference is hereby made to the description of the cooling mechanisms 82, 86, 90, 190, 290 above for details of the structures and operation, as well as alternatives to the structures and operation, of the cooling mechanism 190' not specifically discussed herein.

The illustrated cooling mechanism 190' includes a conduit 194', a fluid discharge 198' (shown in FIGS. 10-11), a pressurized fluid source (not shown but similar to the pressurized fluid source 202 shown FIG. 7), a convex guide member 206', and a dewatering member 210'.

Similar to the conduits 94, 94A, 194, 294 of the cooling mechanisms 86, 90, 190, 290 discussed above, the illustrated conduit 194' has a generally rectangular cross-section. In the illustrated construction, the width of the conduit 194' is substantially constant from an inlet portion 214' of the conduit 194' to an outlet portion 218'.

The conduit 194' includes a lower wall 222', side walls 226', 230' and an upper wall 234'. In a manner similar to the conduit 194, the lower wall 222' and the side walls 226', 230' may integrally be formed as a three-sided member, and the upper wall 234' may be provided by a cover which is removably coupled to the side walls 226', 230'. In such a construction, the upper wall 234' may include lips (not shown) extending over portions of the side walls 226', 230' and may be partially captured under the convex guide member 206' to help retain the upper wall 234' in place. In other constructions, the upper wall 234' may be coupled to the side walls 226', 230' with clamps, fasteners, etc. In yet other constructions, the walls 222', 226', 230' and 234' may be formed integrally.

The conduit 194' defines a central axis 254' extending from the inlet portion 214' to the outlet portion 218'. The axis 254', and thereby the conduit 190', may be offset from and substantially parallel to, oblique to or aligned with and overlying the central longitudinal plane 150 extending through the tank 14 of the food processing system 10 or other system in which the cooling mechanism 190' is used.

In the illustrated construction, the conduit 194' includes an inlet conduit section 350 providing the inlet portion 214' and a main conduit section 354 connected to the inlet conduit section 350 and providing the outlet portion 218'. As shown in FIGS. 10-11, a first end 358 of the inlet conduit section 350 is in communication with a compartment (e.g., compartment 34, 38, 42) and below the fluid level in the compartment. A second end 362 of the inlet conduit section 350 fits within or is inserted into a first end 366 of the main conduit section 354. As discussed below in more detail, the inlet conduit section 350 and the main conduit portion 354 cooperate to define the fluid discharge 198'. In the illustrated construction, the inlet conduit section 350 is generally V-shaped, and the main conduit section 354 is generally inclined toward the outlet portion 218'.

In the illustrated construction, the cooling mechanism 190' generally includes a dual opposing slot discharge arrangement, and the fluid discharge 198' includes a pair of opposing slots 258' positioned proximate the inlet portion 214' of the conduit 194'. The illustrated slots 258' are vertically spaced apart, generally on the top and bottom of the conduit 194' (proximate the lower wall 222' and the upper wall 234'). In other constructions (not shown), in addition to or instead of the top and bottom slots 258', laterally spaced apart slots may be provided on the opposite sides of the conduit 194' (proximate each side wall 226', 230'). Each slot 258' is defined between an outer surface of the second end 362 of the inlet conduit section 350 and an inner surface of a first end 366 of the main conduit section 354.

Similar to the nozzles 158 and to the slot 258 discussed above, each slot 258' helps focus, and thereby pressurize, fluid from the fluid source, ensuring the fluid has sufficient flow strength to push food product upwardly through the conduit 194' to the outlet portion 218'. The slots 258' provide a continuous discharge of fluid along the entire width of and at the top and bottom of the conduit 194'. In the illustrated embodiment, each slot 258' has a height of approximately ⅛" to help focus and pressurize the fluid. In other constructions, the height of each slot 258' may be relatively larger or smaller (e.g., from about 3/16" to about 1/16") to allow more or less fluid to simultaneously flow out of the slot 258'. In still other constructions, the size of the slot 258' may be even larger or smaller depending upon the desired capacity of the transfer mechanism 190'.

Each slot 258' is formed between the outer surface of the inlet conduit section 350 and the adjacent inner surface of the main conduit section 354. A portion of the associated wall (e.g., the lower wall 222' and the upper wall 234') of the main conduit section 354 may be bent to form, in cooperation with the outer surface of the inlet conduit section 350 and with side walls 368, a generally teardrop-shaped chamber or opening 262'.

An outlet pipe 270' of the pressurized fluid source (e.g., a pump (not shown)) is in fluid communication with each opening 262'. The outlet pipe 270' includes a main pipe 370 which branches off into a pipe section 374, 378 connected to each opening 262'. In the illustrated construction, the pipe sections 374, 378 extend through the associated wall 222', 234' of the conduit 194' and into the associated opening 262'. The outlet pipe 270' directs fluid from the pump, through the main pipe 370 and through the pipe sections 374, 378, into each opening 262', and out of each slot 258'. In other constructions (not shown), a separate pipe may be in fluid communication between the pump and each opening 262'.

Similar to the cooling mechanisms 82, 86, 90, 190 discussed above, the fluid discharge 198' and the pump generate a vacuum force at the inlet portion 214' of the conduit 194'. The vacuum force helps draw food product into the inlet portion 214' such that the pressurized fluid exiting the slots 258' can move the food product toward the outlet portion 218'.

In the illustrated construction, the dual opposing slot arrangement of the cooling mechanism 190' effectively doubles the width of the plenum when compared to the cooling mechanism 190. To maintain the same flow rate, the width of the conduit 194' is reduced relative to the width of the conduit 194 (e.g., by about one half), and the depth is increased (e.g., approximately doubled). The dual opposing slot arrangement mirrors the fluid flow effect with each slot 254' (e.g., at the top and bottom of the conduit 194') which may keep food product toward the middle of the conduit 194' (away from the wall associated with each slot 258'). This arrangement also may allow a larger opening for the inlet portion 214' to accommodate larger-sized food products (e.g., larger than about 1" in diameter).

In the cooling mechanism 190', the slots 258' may be positioned relatively farther away from the inlet portion 214' (when compared to the cooling mechanism 190) to allow the food product to accelerate before the transition to full flow rate near the slots 258' so that this transition is not as abrupt. The added distance (approximately 15") generally enables the food product to accelerate before hitting the high velocity transition at the location of the slot 258'.

With the slotted arrangement, the velocity of the fluid ejected from each slot 258' is greater generally toward the center of the slot 258' (between the inner surface of a first end 366 of the main conduit section 354 and the outer surface of the second end 362 of the inlet conduit section 350) and decreases toward the middle of the conduit 194' (and toward the associated wall (e.g., wall 222' or 234')). The food product tends to stay toward the middle of the conduit 194' in an area of lower flow rate fluid. This may contribute to the slotted arrangement being gentler on food products when compared to a nozzle arrangement.

The main conduit section 354 is connected to the convex guide member 206' and to the dewatering member 210'. In the illustrated construction, the dewatering member 210' may have generally the same size and shape as the dewatering member 210 in the cooling mechanism 190. However, because the conduit 194' has a relatively narrower width and increased depth compared to the conduit 194, the convex guide member 206' generally flares to the width of and tapers to the depth of the dewatering member 210'.

Figure 14:
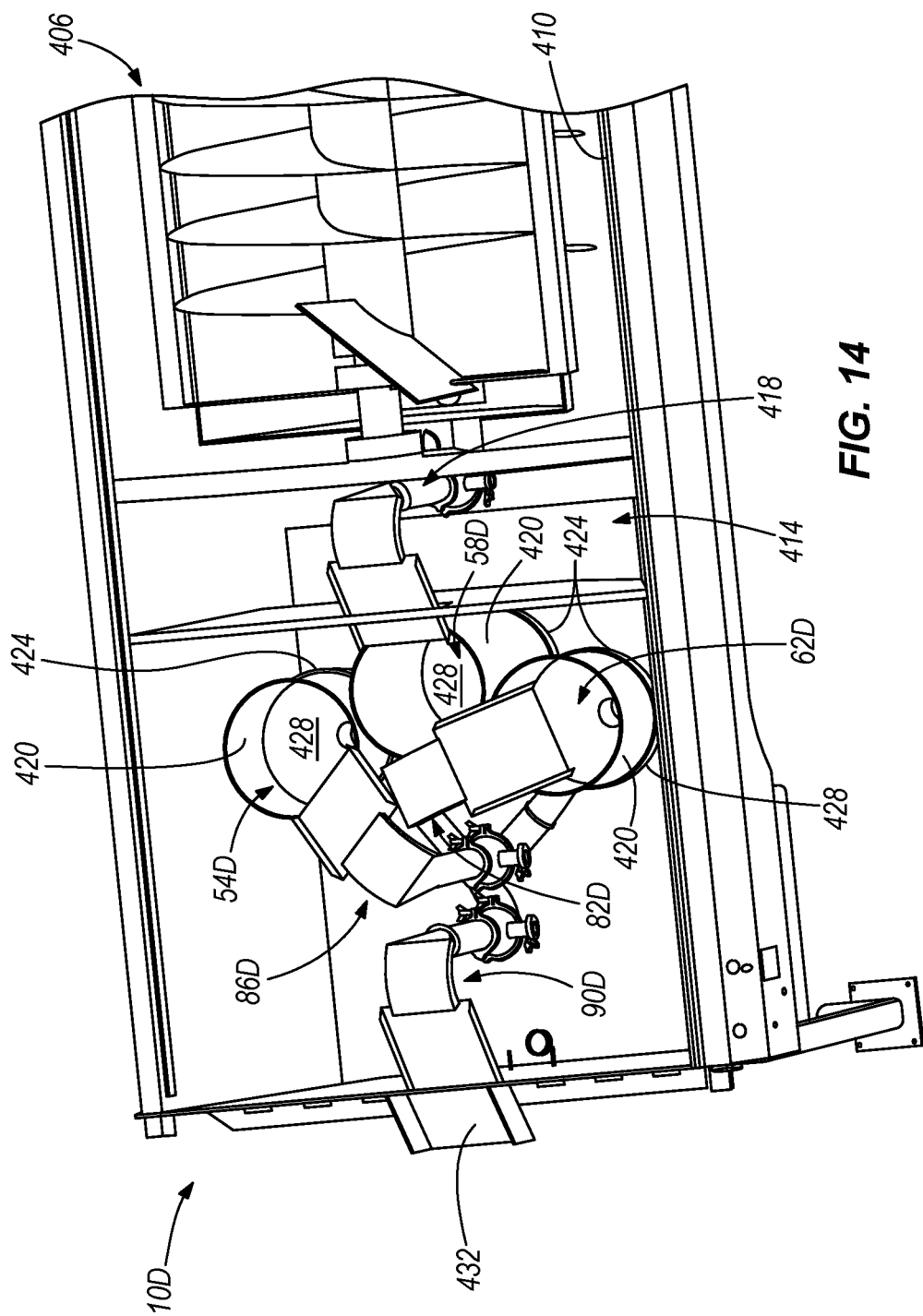
FIG. 14 is a perspective view of a food processing system, such as a cooker-cooler, illustrating an alternative construction of a cooler.
Figure 15:
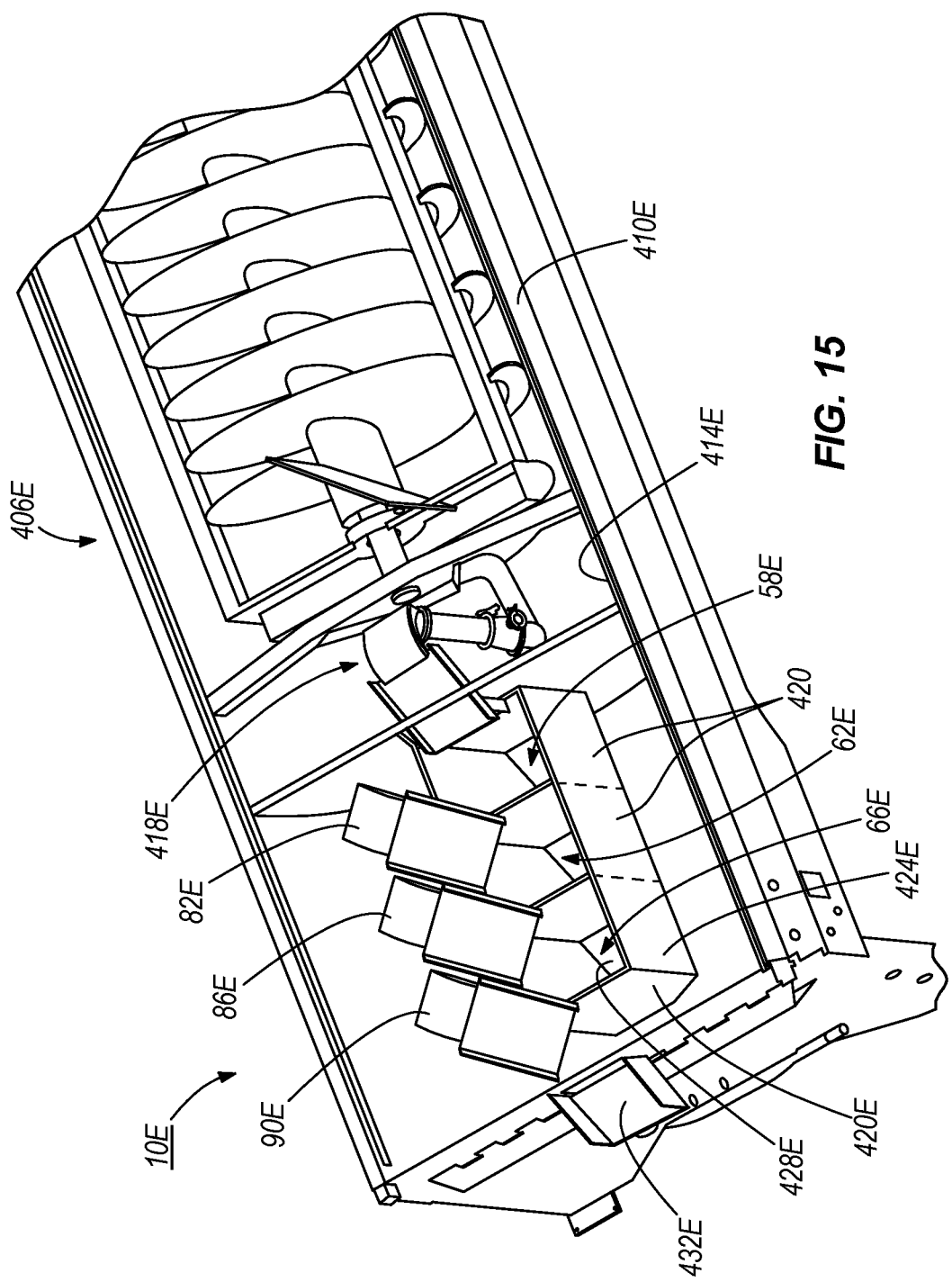
FIG. 15 is a perspective view of a food processing system, such as a cooker-cooler, illustrating another alternative construction of a cooler.
Figure 16:
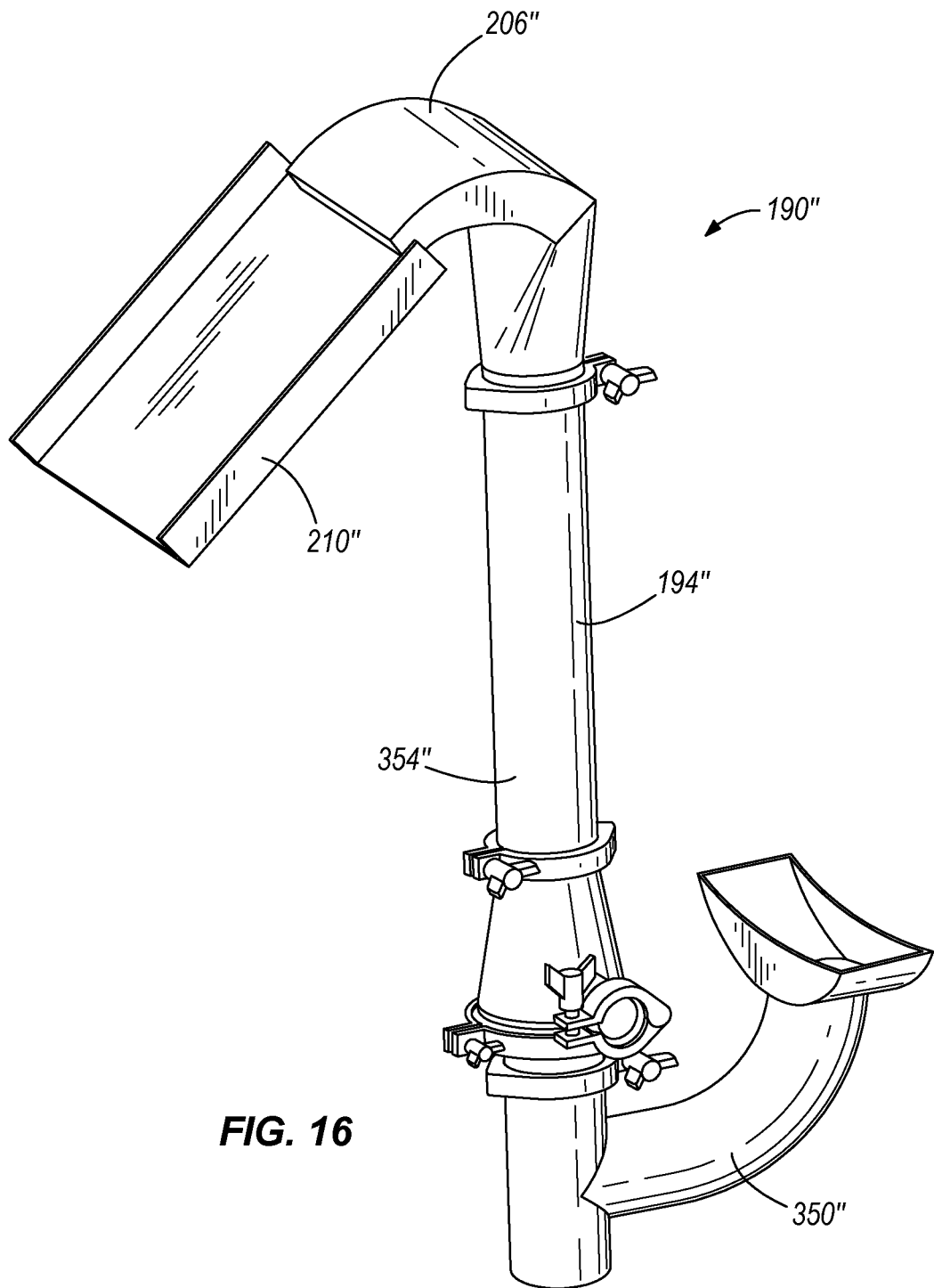
FIG. 16 is a perspective view of another cooling mechanism for use with the cooler shown in FIG. 14 and the cooler shown in FIG. 15.

FIG. 14 and FIG. 15 illustrate alternative constructions of a food processing system such as a cooker-cooler. The illustrated coolers 10D and 10E are similar to the cooler 10 discussed above with respect to FIGS. 1-5. Common elements have the same reference number "D" and "E", respectively. As discussed below in more detail, FIGS. 14 and 15 also illustrate an alternative construction of a cooling mechanism 190". The illustrated cooling mechanism 190" is similar to the cooling mechanisms 190, 290, 190' discussed above with respect to FIGS. 8-13 and/or to the cooling mechanisms 82, 86, 90 discussed above with reference to FIGS. 1-7. Common elements of the cooling mechanism 194" have the same reference numbers """. Reference is hereby made to the description of the cooler 10 and of the cooling mechanisms 86, 90, 190, 190' above for details of the structures and operation, as well as alternatives to the structures and operation, of the coolers 10D and 10E and of the cooling mechanism 190" not specifically discussed herein.

In some cases, a relatively large temperature difference (from 200° F. to 40° F.) or a relatively low final product temperature (e.g., about 40° F.) is not required. In such cases, the fluid temperature in the tank 14 may be maintained at the same temperature (e.g., at approximately 38-42° F.), which may allow simplification of the cooler 10. For example, instead of three separate compartments 34, 38, 42, the simplified cooler 10D, 10E may include and have one large tank 14D, 14E with smaller product containment sections 58D, 62D, 66D and 58E, 62E, 66E, respectively.

As another example, instead of a different pump 102A, 102B, 102 for each cooling mechanism 82, 86, 90, the simplified cooler 10D, 10E may include fewer pumps (e.g., a single pump (not shown but similar to pump 102) to power more than one cooling mechanism (e.g., all of the cooling mechanisms 82D, 86D, 90D and 82E, 86E, 90E, respectively).

Figure 17:
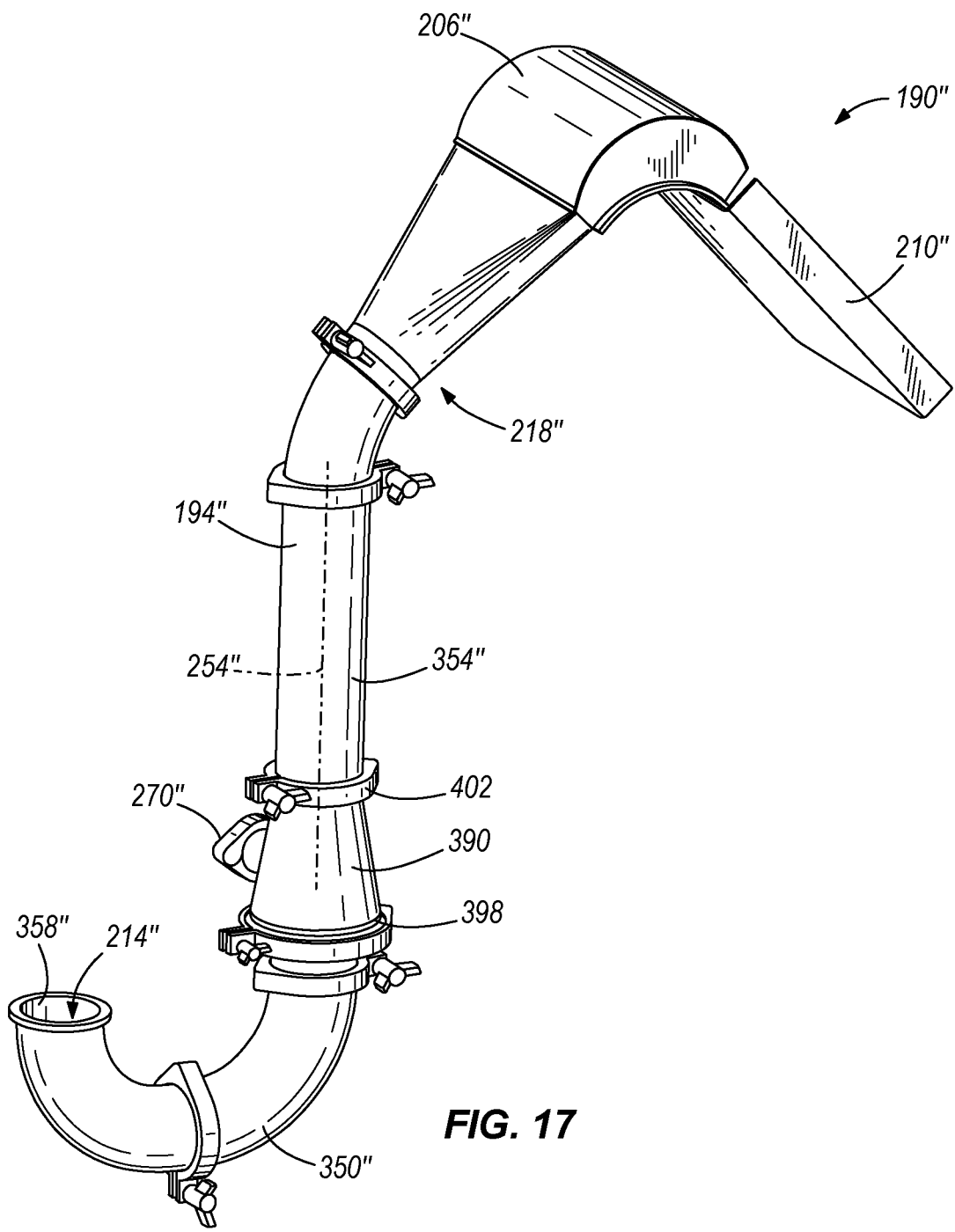
FIG. 17 is another perspective view of the cooling mechanism as shown in FIG. 16.
Figure 18:
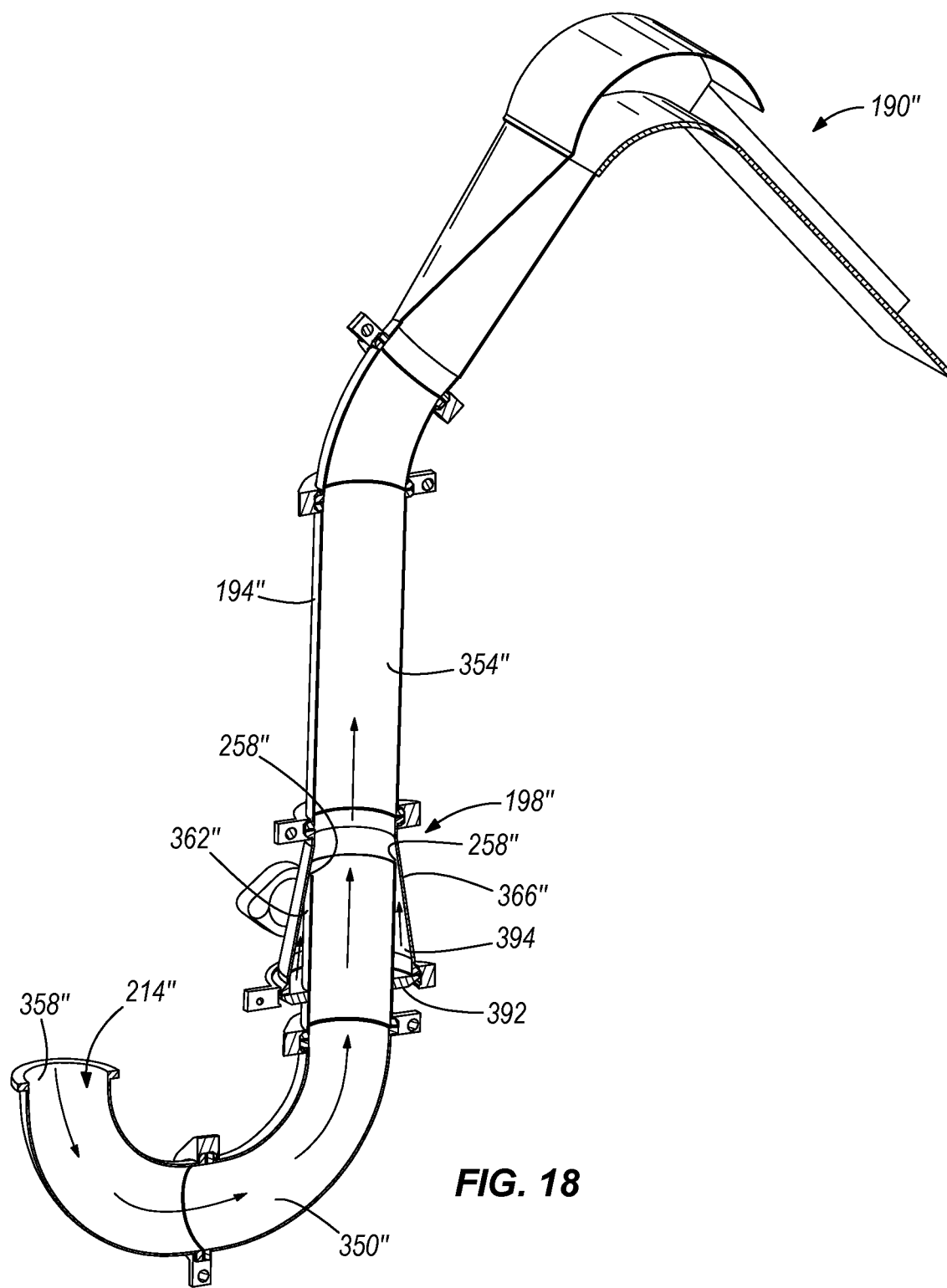
FIG. 18 is a cross-sectional view of the cooling mechanism shown in FIG. 17.
Figure 19:
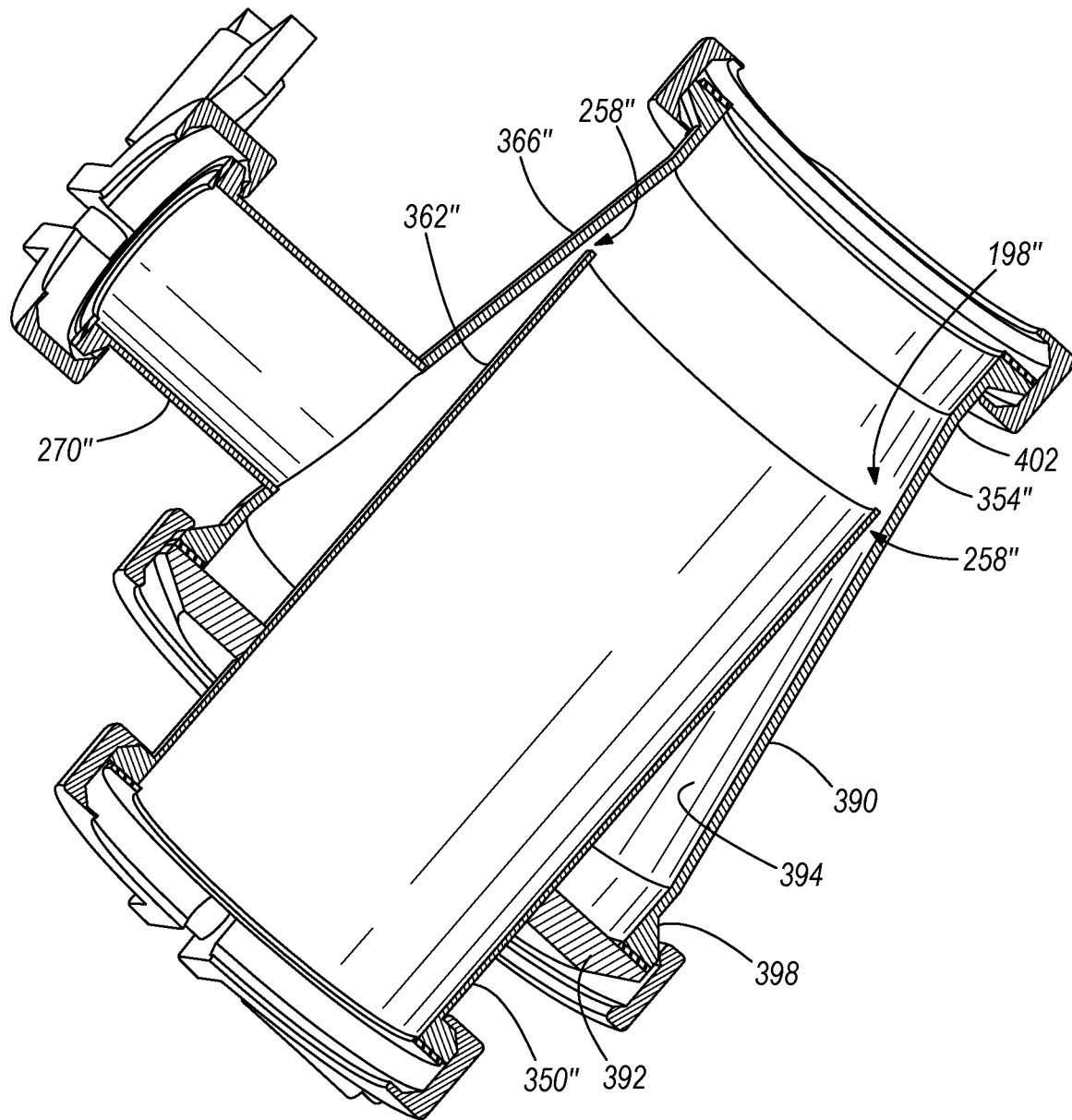
FIG. 19 is an enlarged cross-sectional view of a portion of the cooling mechanism shown in FIG. 18.

In order to provide a more compact system, a more vertical cooling mechanism 190" with a round cross-section may be used. FIGS. 17-19 illustrate such a cooling mechanism 190" in more detail. In the illustrated construction, the cooling mechanism 190" includes a generally round conduit 194" with an annular discharge arrangement. Reference is again made to the cooling mechanisms shown and described in U.S. patent application Ser. No. 12/174,297, filed Jul. 16, 2008, and in U.S. patent application Ser. No. 12/501,649, filed Jul. 13, 2009, the entire contents of both of which were incorporated by reference above.

The illustrated cooling mechanism 190" includes a conduit 194", a fluid discharge 198" (shown in FIGS. 13-14), a pressurized fluid source (not shown but similar to the pressurized fluid source 202 shown FIG. 7), a convex guide member 206", and a dewatering member 210".

As mentioned above, the illustrated conduit 194" has a generally round cross-section. In the illustrated construction, the diameter of the conduit 194" is substantially constant from an inlet portion 214" of the conduit 194" to an outlet portion 218". The conduit 194" defines a central axis 254" extending from the inlet portion 214" to the outlet portion 218". The axis 254", and thereby the conduit 194", may be offset from and substantially parallel to, oblique to or aligned with and overlying the central longitudinal plane 150 extending through the tank 14 of the food processing system 10 or other system in which the cooling mechanism 190" is used.

In the illustrated construction, the conduit 194" includes an inlet conduit section 350" providing the inlet portion 214" and a main conduit section 354" connected to the inlet conduit section 350" and providing the outlet portion 218". As shown in FIGS. 18-19, a first end 358" of the inlet conduit section 350" is in communication with a compartment (e.g., compartment 34, 38, 42) and below the fluid level in the compartment. A second end 362" of the inlet conduit section 350" fits within or is inserted into a first end 366" of the main conduit section 354". As discussed below in more detail, the inlet conduit section 350" and the main conduit portion 354" cooperate to define the fluid discharge 198". In the illustrated construction, the inlet conduit section 350" is generally U-shaped, and the main conduit section 354" includes a substantially vertical portion.

In the illustrated construction, the fluid discharge 198" includes an annular slot 258" positioned proximate the inlet portion 214" of the conduit 194". The illustrated slot 258" extends substantially about the perimeter of the second end 362" of inlet conduit section 350". The slot 258" is defined between an outer surface of the second end 362" of the inlet conduit section 350" and an inner surface of a first end 366" of the main conduit section 354". In other constructions (not shown), the fluid discharge 198" may include one or more slots which extend only about a portion of the circumference.

Similar to the nozzles 158 and to the slot 258, 258', discussed above, the slot 258" helps focus, and thereby pressurize, fluid from the fluid source, ensuring the fluid has sufficient flow strength to push food product upwardly through the conduit 194" to the outlet portion 218". The slot 258" provides a continuous discharge of fluid about the circumference of interior of the conduit 194". In the illustrated embodiment, the slot 258" has a height of approximately ⅛" to help focus and pressurize the fluid. In other constructions, the height of the slot 258" may be relatively larger or smaller (e.g., from about 3/16" to about 1/16") to allow more or less fluid to simultaneously flow out of the slot 258". In still other constructions, the size of the slot 258" may be even larger or smaller depending upon the desired capacity of the transfer mechanism 190".

As mentioned above, the slot 258" is formed between the outer surface of the inlet conduit section 350" and the adjacent inner surface of the main conduit section 354". The main conduit section 354" includes a conical portion 390 surrounding a portion of the outer surface of the inlet conduit section 350" upstream of the slot 258" to form, with an end plate 392, a chamber 394 surrounding the portion of the inlet conduit section 350". An outlet pipe 270" of the pressurized fluid source (e.g., a pump (not shown)) is in fluid communication with the chamber 394. The outlet pipe 270" directs fluid from the pump, into the chamber 394 and out of the slot 258".

The conical portion 390 has a first diameter section 398 with a diameter larger than the outer diameter of the inlet conduit section 350" and tapers to a second diameter section 402 having a diameter about equal to the inner diameter of the inlet conduit section 350". The inlet conduit section 350" is inserted to position between the first diameter section 398 and the second diameter section 402 to define the slot 258" with the desired height. With this arrangement, the conduit 194" generally has the same interior diameter throughout the inlet conduit section 350 and the main conduit section 354".

Similar to the cooling mechanisms 86, 90, 190, 290, 190' discussed above, the fluid discharge 198" and the pump generate a vacuum force at the inlet portion 214" of the conduit 194". The vacuum force helps draw food product into the inlet portion 214" such that the pressurized fluid exiting the slot 258" can move the food product toward the outlet portion 218".

The annular slot arrangement provides the fluid flow effect around the circumference of the interior of the conduit 194" which tends to keep food product toward the middle of the conduit 194" (and away from the wall of the conduit 194"). This arrangement also may allow a larger opening for the inlet portion 214" to accommodate larger-sized food products (e.g., larger than about 1" in diameter).

In the cooling mechanism 190", the slot 258" may be positioned relatively farther away from the inlet portion 214" (when compared to the cooling mechanisms 190, 190') to allow the food product to accelerate before the transition to full flow rate near the slot 258" so that this transition is not as abrupt. The added distance (approximately 25") generally enables the food product to accelerate before hitting the high velocity transition at the location of the slot 258".

Also, with the annular slot arrangement, the velocity of the fluid ejected from the slot 258" is greater generally toward the center of the slot 258" (between the inner surface of a first end 366" of the main conduit section 354" and the outer surface of the second end 362" of the inlet conduit section 350") and decreases toward the middle of the conduit 194" (and toward the wall of the conduit 194"). The food product tends to stay toward the middle of the conduit 194" in an area of lower flow rate fluid. Again, this may contribute to the slot arrangement being gentler on food products when compared to a nozzle arrangement.

The round shape of the conduit 194" may provide increased flexibility with respect to, for example, sanitation, orientation, etc. As mentioned above, the round shape of the conduit 194" provides a flow effect that is annular about the circumference of the interior of the conduit 194". The round conduit 194" may be gentler on food products but also may be more efficient, have greater capacity, provide higher lift, provide easier piping opportunities, etc.

With the round conduit 194", the cooling mechanism 190" may enable the food product to be lifted vertically through a significant portion of the conduit 194". The vertical portion of the conduit 194" generally decreases the overall length of the cooling mechanism 190" and the space requirement in the associated processing system.

The round main conduit section 354" is connected to the convex guide member 206" and to the generally rectangular dewatering member 210". In the illustrated construction, the dewatering member 210" may have generally the same size and shape as the dewatering member 210, 210' in the cooling mechanisms 190, 190'. However, because the conduit 194" has a round cross-section with a diameter that is smaller than the width and greater than the depth of the generally rectangular conduit 194, the convex guide member 206" (and/or the downstream end of the main conduit section 354") transitions from the round cross-section of the conduit 194" to the rectangular cross-section of the dewatering member 210". The convex guide member 206" also generally flares to the width of and tapers to the depth of the dewatering member 210".

The food processing systems shown in FIGS. 14 and 15 are similar, and the system shown in FIG. 14 will be described in more detail. As mentioned above, common elements of the system shown in FIG. 15 have the same reference number "E".

As shown in FIG. 14, the food processing system includes a cooker mechanism 406 positioned within a cooking tank 410 to cook food product and a cooler 10D positioned within cooling tank 14D to cool the food product after cooking. An insulating tank 414 may be provided between the cooking tank 410 and the cooling tank 14D to help separate and insulate the cooking tank 410 from the cooling tank 14D. The insulating tank 414 may be filled with, for example, ambient air. In some constructions, the insulating tank 414 may be omitted and an insulated divider may be positioned between the cooking tank 410 and the cooling tank 14D. In the illustrated construction, the cooking tank 414 and the cooling tank 14 are a part of a single tank.

An elongated cover (not shown) may be provided to mate with and cover and substantially enclose the tank or a portion of the tank (e.g., the cooking tank 410). The cover would generally be attached to the tank in such a manner as to allow the cover to move relative to the tank and permit access to one or more of the sections of the tank (e.g., the cooking tank 410, the cooling tank 14D).

The cooker mechanism 406 uses a hot heat transfer medium, or cooking fluid, to cook the food product, while the cooler 10D uses a cold heat transfer medium, or cooling fluid, to cool the food product. The hot heat transfer medium comprises any number of liquids, non-liquids, or a combination liquid/non-liquid medium, including, but not limited to, water, steam, heated gas or vapor, water and steam, water and water vapor, or the like. Similarly, the cool heat transfer medium may include a cool liquid medium, such as water, or a cool gas medium.

In the illustrated construction, the cooker mechanism 406 includes a rotary screw blancher. An example of a suitable rotary screw blancher is described and illustrated in U.S. patent application Ser. No. 11/216,478, filed Aug. 31, 2005, now Publication No. 2007/0044666, the entire contents of which is hereby incorporated by reference. In other constructions, the food processing system may include a rotary drum blancher or another suitable cooker mechanism to cook the food product. In further constructions, the food processing system may include multiple cooker mechanisms and/or coolers located in a series of compartments to incrementally cook or cool the food product, respectively.

A transfer mechanism 418 is provided to transfer hot, cooked food product from the outlet of the cooker mechanism 406 to the cooler 10D. In the illustrated construction, the transfer mechanism 418 has the same structure as the cooling mechanism 190", and reference is made to the above description of the cooling mechanism 190". In other constructions, the transfer mechanism 384 may have structure similar to the cooling mechanisms 82, 86, 90, 190, 290, 190', also discussed above.

The transfer mechanism 418 may only operate to transfer the hot, cooked food product to the cooler 10D, 10E. The transfer mechanism 418 may also operate to begin cooling the food product as it is transferred to the cooler 10D.

The cooler 10D may include and have one large cooling tank 14D with smaller product containment sections 58D, 62D, 66D each having a side wall 420 and a bottom portion 424. The bottom portion 424 of each product containment sections 58D, 62D, 66D includes a screen 428 to allow fluid in the cooling tank 14D to flow into the product containment sections 58D, 62D, 66D. Accordingly, the temperature of the fluid in each cooling mechanism 190" is generally the same, and the fluid can be supplied by a single pump 102D. Also, segregation of heated fluid between the product containment sections 58D, 62D, 66D is not required, and carry-over of heated fluid between the product containment sections 58D, 62D, 66D is less of an issue.

As described above, the more vertical round cooling mechanisms 190" may provide compactness of the system.

Such cooling mechanisms 190" may also allow more flexible arrangements of the product containment sections 58D, 62D, 66D within the cooling tank 14D. In the construction shown in FIG. 14, the product containment sections 58D, 62D, 66D are arranged as three generally round sections spread out in the larger supply tank 14D. The round product containment sections 58D, 62D, 66D have conical bottom portions 424 which may improve product containment, product/fluid flow, cleaning (no corners), etc. As shown in FIG. 15, the cooler 10E also includes three product containment sections 58E, 62E, 66E which are generally in line along the centerline of the tank 14E. While the illustrated cooler 10D includes three product containment sections 58D, 62D, 66D, in other constructions, the cooler 10D may have fewer or more sections.

The screen 428 near the bottom portion 424 allows fluid from the larger tank 14D to flow into each product containment section 56D, 60D, 66D. The cooling mechanisms 190" draw fluid from the tank 14D into the product containment sections 56D, 60D, 66D so that the cooling mechanisms 190" can draw fluid with the food product into the conduit 194" and discharge the product.

In both coolers 10D, 10E, the dewatering members 110D, 110E allow the fluid to fall back into the one larger tank 14D, 14E. As mentioned above, this may, for example, reduce the number of pumps required. However, this may limit the temperature difference which can be achieved or greatly increase the volume of recirculated cooling water.

In operation, uncooked food product is inserted into the food processing system through the inlet of the cooking tank 410. Referring to FIG. 14, the rotary screw blancher is operated to move the uncooked food product through the hot heat transfer medium in the cooking tank 410. As the food product moves through the heat transfer medium, the food product becomes cooked. The food product travels through the cooking tank 410 until reaching the discharge of the rotary screw blancher. At the discharge, the vacuum force generated in the transfer mechanism 418 pulls the cooked food product into the conduit 194" of the transfer mechanism 418.

Hot food product is transferred from the transfer mechanism 418 into the cooler 10D and is received in the product containment section 58D. The relatively colder heat transfer medium within the product containment section 58D (and within the tank 14D) begins to rapidly cool the food product. The first cooling mechanism 82D cools and transfers the food product to the second product containment area 62D. As mentioned above, the heated fluid falls back into the tank 14D. The cooling process is repeated in the second and third cooling mechanisms 86D, 90D until the cooled food product is discharged from the cooler 10 (e.g., via a discharge chute 432). The cooked and cooled food product may be directed to a packaging system or another food processing system.

Although the invention has been described in detail with reference to certain embodiments, variations and modifications exist within the scope and spirit of one or more independent aspects of the invention as described. Various features and advantages of the invention are set forth in the following claims.

What is claimed is:

1. A cooler comprising:
    a compartment;
    a conduit including a first end portion configured to be in communication with the compartment and a second end portion, food product at a first product temperature entering the first end portion;
    a fluid discharge positioned substantially within the conduit between the first end portion and the second end portion;
    a pressurized fluid source in communication with and for supplying fluid through the fluid discharge, the fluid being at a first fluid temperature less than the first product temperature, the pressurized fluid source being operable to propel the fluid through the fluid discharge to move the food product from the first end portion of the conduit toward the second end portion and to cool the food product to a temperature below the first product temperature;
    a second compartment separate from the first-mentioned compartment, the second compartment receiving food product from the second end portion of the first-mentioned conduit;
    a second conduit including a first end portion configured to be in communication with the second compartment and a second end portion, food product at a second product temperature entering the first end portion of the second conduit;
    a second fluid discharge positioned substantially within the second conduit between the first end portion and the second end portion; and
    a second pressurized fluid source in communication with and for supplying fluid through the second fluid discharge, the fluid being at a second fluid temperature less than the second product temperature, the second pressurized fluid source being operable to propel the fluid through the second fluid discharge to move the food product from the first end portion of the second conduit toward the second end portion of the second conduit.

2. The cooler of claim 1, and further comprising:
    a third compartment separate from the first-mentioned compartment and the second compartment, the third compartment receiving food product from the second end portion of the second conduit;
    a third conduit including a first end portion configured to be in communication with the third compartment and a second end portion, food product at a third product temperature entering the first end portion of the third conduit;
    a third fluid discharge positioned substantially within the third conduit between the first end portion and the second end portion; and
    a third pressurized fluid source in communication with and for supplying fluid through the third fluid discharge, the fluid being at a third fluid temperature less than the third product temperature, the third pressurized fluid source being operable to propel the fluid through the third fluid discharge to move the food product from the first end portion of the third conduit toward the second end portion of the third conduit.

3. The cooler of claim 1, wherein the food product is discharged from the cooler through the second end portion of the second conduit.

4. The cooler of claim 1, wherein the conduit includes an inlet conduit section providing the first end portion, the inlet conduit section having an inlet end in fluid communication with the compartment and an opposite end with an outer surface, and
    a main conduit section having a first end with an inner surface, the opposite end of the inlet conduit section being inserted in the first end of the main conduit section,
    wherein the fluid discharge includes a slot at least partially defined between the outer surface of the opposite end of the inlet conduit section and the inner surface of the first end of the main conduit section.

5. The cooler of claim 4, wherein the inlet conduit section has a round cross-section and a circumference, wherein the main conduit section has a round cross-section, wherein the fluid discharge includes a slot at least partially defined between the outer surface of the opposite end of the inlet conduit section and the inner surface of the first end of the main conduit section, the slot extending about the circumference of the opposite end of the inlet conduit section, and wherein the pressurized fluid source is operable to propel a fluid through the slot to move the food product from the first end portion of the conduit toward the second end portion.

6. The cooler of claim 4, wherein the inlet conduit section includes first walls forming a generally rectangular cross-section, wherein the main conduit section includes second walls forming a generally rectangular cross-section, wherein the fluid discharge includes a slot defined between the outer surface of one first wall of the inlet conduit section and the inner surface of an associated one second wall of the main conduit section, and wherein the pressurized fluid source is operable to propel a fluid through the slot to move the food product from the first end portion of the conduit toward the second end portion.

7. The cooler of claim 6, wherein the inlet conduit section includes two pairs of opposing first walls forming the generally rectangular cross-section, wherein the main conduit section includes two pairs of opposing second walls forming the generally rectangular cross-section, wherein the fluid discharge includes a first slot defined between the outer surface of one first wall of one pair of opposing first walls of the inlet conduit section and the inner surface of one second wall of an associated pair of opposing second walls of the main conduit section, and
    an opposing second slot defined between the outer surface of the other first wall of the one pair of opposing first walls of the inlet conduit section and the inner surface of the other second wall of the associate pair of opposing second walls of the main conduit section, and
    wherein the pressurized fluid source is operable to propel a fluid through the first slot and through the second slot to move the food product from the first end portion of the conduit toward the second end portion.

8. The cooler of claim 1, wherein the first end portion of the conduit is configured to be positioned below the fluid level in the compartment, and wherein the second end portion of the conduit is configured to be positioned above a fluid level in the compartment.

9. The cooler of claim 8, wherein the conduit includes a substantially vertical portion between the first end portion and the second end portion.

10. The cooler of claim 1, and further comprising a dewatering member in communication with the second end portion of the conduit, wherein the dewatering member receives the food product and the fluid from the conduit and facilitates separating the food product from the fluid.

11. The cooler of claim 10, wherein the dewatering member discharges separated fluid into the compartment.

12. The cooler of claim 10, and further comprising a convex guide member positioned between the second end portion of the conduit and the dewatering member, wherein the convex guide member directs the food product and the fluid from the conduit into the dewatering member.

13. A cooler comprising:
    a first compartment;
    a first conduit including a first end portion configured to be in communication with the first compartment and a second end portion, food product at a first product temperature entering the first end portion of the first conduit;
    a first fluid discharge positioned substantially within the first conduit between the first end portion and the second end portion;
    a second compartment separate from the first-mentioned compartment, the second compartment receiving food product from the second end portion of the first-mentioned conduit;
    a second conduit including a first end portion configured to be in communication with the second compartment and a second end portion, food product at a second product temperature entering the first end portion of the second conduit;
    a second fluid discharge positioned substantially within the second conduit between the first end portion and the second end portion; and
    a pressurized fluid source in communication with and for supplying fluid through at least one of the first fluid discharge and the second fluid discharge, the fluid being at a first fluid temperature less than an associated at least one of the first product temperature and the second product temperature, the pressurized fluid source being operable to propel the fluid through the at least one of the first fluid discharge and the second fluid discharge to move the food product through an associated at least one of the first conduit and the second conduit from the first end portion of toward the second end portion.

14. The cooler of claim 13, and further comprising:
    a third compartment separate from the first-mentioned compartment and the second compartment, the third compartment receiving food product from the second end portion of the second conduit;
    a third conduit including a first end portion configured to be in communication with the third compartment and a second end portion, food product at a third product temperature entering the first end portion of the third conduit; and
    a third fluid discharge positioned substantially within the third conduit between the first end portion and the second end portion;
    wherein the pressurized fluid source is in communication with and supplies fluid through at least one of the first fluid discharge, the second fluid discharge and the third fluid discharge, the fluid being at a first fluid temperature less than an associated at least one of the first product temperature, the second product temperature and the third product temperature, the pressurized fluid source being operable to propel the fluid through the at least one of the first fluid discharge, the second fluid discharge and the third fluid discharge to move the food product through an associated at least one of the first conduit, the second conduit and the third conduit from the first end portion of toward the second end portion.

15. The cooler of claim 13, and further comprising a tank, the first compartment and the second compartment being provided in the tank.

16. The cooler of claim 15, wherein the tank includes a tank outer wall defining a tank interior and a divider wall at least partially dividing the tank interior, the first compartment being defined between a first portion of the tank outer wall and the divider wall and the second compartment being defined between a second portion of the tank outer wall and the divider wall.

17. The cooler of claim 16, wherein fluid flow between the first compartment and the second compartment is limited to flow over a top edge of the divider wall.

18. The cooler of claim 15, wherein the tank includes a tank outer wall, wherein the first compartment includes a first compartment wall defining the first compartment and spaced inwardly from the tank outer wall, and wherein the second compartment includes a second compartment wall defining the second compartment and spaced inwardly from the tank outer wall.

19. The cooler of claim 18, wherein the first compartment includes a first compartment bottom wall portion, the first compartment bottom wall portion including a first screen portion, fluid flowing from the tank and into the first compartment through the first screen portion, and wherein the second compartment includes a second compartment bottom wall portion, the second compartment bottom wall portion including a second screen portion, fluid flowing from the tank and into the second compartment through the second screen portion.

20. The cooler of claim 13, and further comprising a dewatering member in communication with the second end portion of the first conduit, wherein the dewatering member receives the food product and the fluid from the first conduit and facilitates separating the food product from the fluid.

21. The cooler of claim 20, wherein the dewatering member discharges separated fluid into the first compartment.

22. The cooler of claim 20, wherein the dewatering member discharges at least some separated fluid outside of the first compartment.

23. A method of cooling food product in a cooler, the cooler including
a first compartment,
a conduit including a first end portion configured to be in communication with the first compartment and a second end portion, a fluid discharge positioned substantially within the conduit between the first end portion and the second end portion, and a pressurized fluid source in communication with and for supplying fluid through the fluid discharge,
a second compartment separate from the first compartment, a second conduit including a first end portion configured to be in communication with the second compartment and a second end portion, and a second fluid discharge positioned substantially within the conduit between the first end portion and the second end portion, the method comprising the acts of:
receiving food product into the first compartment;
discharging fluid through the fluid discharge to move food product from the first end portion of the conduit toward the second end portion the food product being at a first product temperature when entering the first end portion, the fluid being at a first fluid temperature less than the first product temperature;
cooling the food product moving through the conduit to a temperature below the first product temperature;
receiving food product into the second compartment from the second end portion of the first-mentioned conduit; and
discharging fluid through the second fluid discharge to move food product from the first end portion of the second conduit toward the second end portion of the second conduit, the food product being at a second product temperature when entering the first end portion of the second conduit, the fluid being at a second fluid temperature less than the second product temperature.

24. The method of claim 23, wherein the cooler further includes a third compartment separate from the first compartment and the second compartment, a third conduit including a first end portion configured to be in communication with the third compartment and a second end portion, a third fluid discharge positioned substantially within the conduit between the first end portion and the second end portion, and wherein the method further comprises the acts of:
receiving food product into the third compartment from the second end portion of the second conduit;
discharging fluid through the third fluid discharge to move food product from the first end portion of the third conduit toward the second end portion of the third conduit, the food product being at a third product temperature when entering the first end portion of the third conduit, the fluid being at a third fluid temperature less than the third product temperature;
cooling the food product moving through the third conduit to a temperature below the third product temperature; and
discharging food product from the cooler through the second end portion of the third conduit.

* * * * *